US011959330B2

(12) United States Patent
Lee

(10) Patent No.: US 11,959,330 B2
(45) Date of Patent: Apr. 16, 2024

(54) INSULATING AND GLASS PANEL SUPPORTING STRUCTURE OF WINDOW FRAME SASH IN CENTER BAR PORTION AT WHICH TWO-SIDE SUPPORTING FRAME WINDOW SASHES OF SLIDING WINDOW OVERLAP

(71) Applicant: FILOBE CO., LTD., Gyeongsan-si (KR)

(72) Inventor: Kwang-Seog Lee, Daegu (KR)

(73) Assignee: FILOBE CO., LTD., Daegu (KR)

( * ) Notice: Subject to any disclaimer, the term of this patent is extended or adjusted under 35 U.S.C. 154(b) by 0 days.

(21) Appl. No.: 17/630,626

(22) PCT Filed: Jul. 31, 2019

(86) PCT No.: PCT/KR2019/009551
§ 371 (c)(1),
(2) Date: Jan. 27, 2022

(87) PCT Pub. No.: WO2021/020626
PCT Pub. Date: Feb. 4, 2021

(65) Prior Publication Data
US 2022/0341251 A1 Oct. 27, 2022

(51) Int. Cl.
*E06B 3/26* (2006.01)
*E06B 3/267* (2006.01)

(52) U.S. Cl.
CPC ................ *E06B 3/267* (2013.01); *E06B 3/26* (2013.01)

(58) Field of Classification Search
CPC ............. E06B 3/26301; E06B 3/26303; E06B 3/26307; E06B 3/267; E06B 3/2675; E06B 3/26347; E06B 3/42; E06B 3/46; E06B 3/4609; E06B 3/4618; E06B 3/4627; E06B 2003/26312; E06B 2003/26329; E06B 2003/2635; E06B 2003/26352
See application file for complete search history.

(56) References Cited

U.S. PATENT DOCUMENTS 3,896,589 A * 7/1975 Mitchell ............. E06B 3/66319 49/504
4,064,653 A * 12/1977 Randall ............... E06B 3/26347 49/458
4,151,682 A * 5/1979 Schmidt .............. E06B 3/26347 49/404
4,202,137 A * 5/1980 Randall ................. E06B 3/4609 49/458
4,398,372 A * 8/1983 Anderson ............... E05B 65/08 49/DIG. 1

(Continued)

*Primary Examiner* — Kyle J. Walraed-Sullivan

(57) ABSTRACT

The present invention relates to a heat insulation and support structure between a moving window (sliding window) and a fixed window constituting a sliding window system, or between a moving window and another moving window. More particularly, the present invention relates to a window chassis insulating structure and a glass panel supporting (mounting) structure including technical improvements in a center bar portion in which a window chassis of a movable window and a fixed window (or other movable window) overlap each other when a sliding window of a two-side supporting frame window having a two-sided supporting frame for supporting only both sides of a glass window constituting a sliding window system, is closed.

13 Claims, 24 Drawing Sheets

(56) References Cited

U.S. PATENT DOCUMENTS 4,483,099 A * 11/1984 Schmidt ................ E06B 3/4618 49/63
4,554,770 A * 11/1985 Anders ............... E06B 3/26347 49/458
4,555,868 A * 12/1985 Mancuso .................. E06B 3/50 49/504
4,674,246 A * 6/1987 Giguere ................ E06B 3/4618 49/419
4,763,446 A * 8/1988 Kelly ...................... E05D 15/06 52/207
4,807,395 A * 2/1989 Kelly ...................... E05D 15/06 49/456
4,924,628 A * 5/1990 Ruby .................... E06B 3/4609 49/404
4,944,118 A * 7/1990 Biro .......................... E06B 3/44 49/504
5,274,955 A * 1/1994 Dallaire ................ E06B 3/4609 49/458
5,446,997 A * 9/1995 Simonton ................. E06B 3/44 49/458
5,806,256 A * 9/1998 Byrne ....................... E06B 3/28 52/656.1
6,041,552 A * 3/2000 Lindahl ................. E06B 3/4609 49/458
9,441,405 B2 * 9/2016 Chubb ................ E05D 15/0686
2003/0201071 A1 * 10/2003 Kobayashi .............. E06B 3/301 160/10
2006/0026913 A1 * 2/2006 Turner ...................... E06B 3/44 52/204.5
2008/0104892 A1 * 5/2008 Cox .......................... E06B 5/12 49/504
2008/0245027 A1 * 10/2008 Lambertini ......... E06B 3/26347 29/897.312
2010/0180504 A1 * 7/2010 Kernaghan ........... E06B 3/4618 24/457
2014/0318015 A1 * 10/2014 Nam ....................... B08B 3/022 49/70
2015/0247358 A1 * 9/2015 Kim .......................... E06B 7/28 49/408
2016/0130859 A1 * 5/2016 Takada ...................... E06B 3/66 52/202
2019/0119974 A1 * 4/2019 Weavers ................... E06B 3/24
2019/0145155 A1 * 5/2019 Minelli ............... E06B 3/26347 49/449
2020/0056419 A1 * 2/2020 Lee ..................... E05D 15/0621
2020/0109595 A1 * 4/2020 Woodward .......... E06B 3/26303
2020/0165862 A1 * 5/2020 Cohen ....................... E06B 3/42

* cited by examiner

- Prior Art -

- Prior Art -

[ a-a' section ]

- Prior Art -

[ b-b' section ]

- Prior Art -

- Prior Art -

[ a-a' section ]

- Prior Art -

- Prior Art -

- Prior Art -

[ a-a' section ]

- Prior Art -

[ b-b' section ] - A type

- Prior Art -

[ b-b' section ] - B type

- Prior Art -

- Prior Art -

[ a-a' section ]

- Prior Art -

- Prior Art -

INSULATING AND GLASS PANEL SUPPORTING STRUCTURE OF WINDOW FRAME SASH IN CENTER BAR PORTION AT WHICH TWO-SIDE SUPPORTING FRAME WINDOW SASHES OF SLIDING WINDOW OVERLAP

TECHNICAL FIELD

The present invention relates to a heat insulation and support structure between a moving window (sliding window) and a fixed window constituting a sliding window system, or between a moving window and another moving window. More particularly, the present invention relates to a window chassis insulating structure and a glass panel supporting (mounting) structure in a center bar portion in which a window chassis of a movable window and a fixed window (or other movable window) overlap each other when a sliding window of a two-side supporting frame window having a two-sided supporting frame for supporting only both sides of a glass window constituting a sliding window system, is closed,

BACKGROUND ART

In general, when a sliding window (moving window) and a fixed window of four-side supporting frame window type that support the four sides of the glass window with thick supporting frames as a movable window (sliding window) and a fixed window constituting a sliding window system are used (FIG. 1*a*), as shown in a-a' cross-sectional view (longitudinal cross-sectional view) of FIG. 1*b*, the sliding window system has a structure in which a roller slides along a roller guide rail on a chassis frame 1 by providing the roller installed on a lower part of a window chassis 2*a* in which a glass is fitted. However, in case of a four-side supporting frame window type, as shown in the b-b' cross-sectional view (cross-sectional view) of FIG. 1*b*, there was no great difficulty in achieving both solid glass supporting function and good thermal insulating function through a shape and a structure of a portion where the glass (glass panel) is inserted and fixed and a thick (80-100 mm) center bar portion of the window chassis 2*a* that can provides insulating and sealing function as well as glass supporting function when the sliding window (moving window) and the fixed window are overlapped.

However, in recent years, as the openness of windows is emphasized, a two-side supporting frame window type sliding window (refer to FIG. 2*a*) supporting only both sides of a glass window constituting a sliding window is increasingly used. In an example of this two-side support frame window type sliding window (example of Schueco's product in Germany), a two-sided window chassis 2*b* into which a glass 2*g* is fitted exists only on both sides of the glass 2*g*, and moreover for wide openness, the two-sided window chassis 2*b* should have a narrow chassis width of about 40 mm. And as shown in the cross-sectional view of the [a-a'] line in FIG. 2*b*, under the glass 2*g*, a lower glass support insulation brackets 2*p* as a member (organic product such as polyamide or PVC) that wraps the glass end for the purpose of preventing damage, buffering, and insulation without an aluminum chassis, is provided. As a roller 2*r* is directly coupled to the lower glass support insulation bracket 2*p*, the sliding window of the two-side support frame window type has a structure in which the roller 2*r* slides along the roller guide rail on the window frame 1. In addition, as shown in the b-b' cross-sectional view of the open state of FIG. 2*c* and the b-b' cross-sectional view of the closed state of FIG. 2*d* and the enlarged view of the main parts, among a thin side chassis parts 2*b*1 and 2*b*2 provided in the inner and outer surfaces to support a glass side support insulation bracket 2*gb* attached to and coupled to the side of the glass 2*g*, an aluminum metal outer cap 2*b*1 which has relatively excellent holding force, should not extend to the overlapping (closed state) portion CN of the sliding window in order to improve thermal insulation performance. (When aluminum is formed in a '⊂' shape, a heat transfer path is connected from the inside to the outside, resulting in rapid heat loss, which leads to a problem in that energy efficiency is reduced and therefore surface condensation of water is induced.) On the other hand, a synthetic resin (or carbon fiber) inner cap 2*b*2 and the glass side support insulation bracket 2*gb* are arranged adjacent to each other to form a center bar portion. Here, mohair for wind/dust protection or external and internal elastic gaskets (g-out, g-in in FIG. 2*d*) for insulation are symmetrically installed and provide a windproof structure.

Thanks to this structure, it is possible to achieve a certain level of thermal insulation performance, however, when the sliding window is closed, the force holding the glass (2*g*) in the overlapping portion (CN) is weak. As a result, there is a problem of exposing structural weakness that excessive deformation occurs in the glass side support insulation bracket 2*gb* made of synthetic resin in an environment where strong wind acts on the glass.

On the other hand, as an example of a sliding window of another two-side supporting frame window type (refer to FIG. 2*a*) having a structure different from the structure described above, in the example shown in FIGS. 3*a* to 3*d* (Example of Sky-frame's product in Switzerland), a window chassis 2*b* into which a glass 2*g* is fitted exists only on both sides of the glass 2*g*, and there is no aluminum chassis under the glass 2*g* as shown in the cross-sectional view of the line [a-a'] of FIG. 3*a*. In addition, as shown in the b-b' cross-sectional view of the open state of the general window of FIG. 3*b* and the double-opening window of FIG. 3*c*, and the b-b' cross-sectional view and enlarged view of the closed state of the double-opening window of FIG. 3*d*, among a thin side chassis parts 2*b*1 and 2*b*2 provided to support a glass side support insulation bracket 2*gb* attached and coupled to the side surfaces of the glass 2*g* from the side, an aluminum metal outer cap 2*b*1 does not extend to the overlapping (closed) portion (CN) of the sliding window for improved insulation performance, and only a synthetic resin inner cap 2*b*2 and the glass side support insulation bracket 2*gb* are disposed adjacent to each other in the closed state. However, in order to solve the problem of insufficient rigidity (excessive deformation) according to the properties of the material of the synthetic resin inner cap in the overlapping portion CN when the sliding window is closed, in the state where the assembly of the glass 2*g* is completed, another cap 2*gc* being inserted into the gap portion between synthetic resin inner cap 2*b*2 and the glass side support insulation bracket 2*gb* in a wedge shape so that there is no loose gap between them, is additionally provided.

However, before the assembly of the glass 2*g* is completed, as shown in FIG. 3*d* of the accompanying drawings, in the process of coupling the synthetic resin inner cap 2*b*2 into the aluminum metal outer cap 2*b*1, as shown in FIG. 3*d*, they must be interconnected through a roller compression processing process. At this time, due to a protruding outer stepped portion 2*b*1*a* of the aluminum metal outer cap 2*b*1, it is difficult to draw into the roller, so that processing thereof is difficult. Furthermore, it is possible to achieve a certain level of rigidity increase performance, but due to the high deformability and plasticity of the synthetic resin inner cap 2*b*2, there is a problem in that structural weaknesses due to large deformation occurring in the synthetic resin inner cap 2*b*2 and the glass side support insulation bracket 2*gb* made of synthetic resin cannot be completely eliminated in the environments where strong winds act on the glass. This situation occurs because the force itself that holds the glass 2*g* from the side at the overlapping portion CN when the sliding window is closed is not increased.

As an example of a sliding window (refer to FIG. 2*a*) of a two-side support frame window type of another structure, in the example shown in FIGS. 4*a* to 4*c* (an example of a product manufactured by 'Panoramah' of Switzerland), the material of an inner cap 2*b*2 that supports, from the inside, a glass side support insulation bracket 2*gb* corresponding to the portion holding the glass 2*g* from the side in the overlapping portion (CN) when the sliding window is closed, is also a soft synthetic resin material. Therefore, it has structural weaknesses in the same meaning.

Technical Problem

The present invention is to solve the problems of the prior invention of the applicant of the present application described above. It is a technical problem of the present invention to provide a specially improved structure for the component corresponding to the inner cap 2*b*2 in the prior art so as to control the deformation of the glass side support insulation bracket 2*gb* in a window type sliding window with a two-side supporting frame that supports only both sides of the glass window constituting the sliding window, in order to maintain good thermal insulation function and to secure better glass panel fixing function in constituting a narrow window chassis 2*b* that exists only on both sides of the glass 2*g*, even if a structure is adopted that the aluminum metal outer cap 2*b*1, which has relatively excellent fixing support, does not extend to the portion CN where the sliding window overlaps (when closed) in order to improve its thermal insulation performance, among the thin side chassis parts 2*b*1 and 2*b*2 provided to support the glass side support insulation bracket 2*gb* attached to and coupled to the side surface of the glass 2*g* from the inner and outer surfaces.

Technical Solution

In order to solve the above-described technical problem, the present invention provides a window chassis insulating structure and glass panel supporting structure of two-side support frame window chassis at the center bar portions where the two-side support frame window chassis overlap each other when a sliding window closed, in a sliding window system of two-side support frame window type that supports only both sides of the glass windows constituting the sliding window,

- wherein a structure is provided in which a roller is directly coupled to a lower glass support insulating bracket (soft material) without an aluminum chassis under the glass panel and slides along the roller guide rail on the window frame,
- wherein the window chassis insulating structure and glass panel supporting structure comprises,
- glass support insulation brackets attached to a side of each of glass panels;
- side chassis portions made of an aluminum material provided to support the glass support insulation brackets from inner and outer surfaces;
- protruding edge portions and first fitting slots provided on inner extension support ends extending from the side chassis portions to the center bar portions;
- side elastic insulating support assemblies comprising a first plates slidably coupled to the first fitting slots: a second plates disposed to be spaced apart from the first plates in a side direction of the glass panels and provided to support the side surface of the glass support insulation brackets: and heat insulating connectors of elastic material coupled between the first plates and the second; and
- rigid support members formed to be additionally fitted in a wedge manner into the first plates of the side elastic insulating support assemblies and, at the same time, into the protruding edge portions of the side chassis portions,
- wherein the rigid support members being provided as a reinforced synthetic resin material in a symmetrical direction in which the window chassis overlap each other on the side surfaces of the side elastic insulation support assemblies, respectively, in order to control displacement or deformation width of the side elastic insulating support assemblies so as to increase force holding the glass panels at side.

Herein, the rigid support members preferably comprise;

- fitting slots into which extended ends of the second plates of the side elastic insulating support assemblies are fitted and coupled;
- step edge portions engaged with the protruding edge portions provided on inner extension support ends extending from the side chassis portions to the center bar portions; and
- protruding side support ends between the fitting slots and the stepped edge portions.

Furthermore, protruding fitting ends are provided on opposite surfaces of the first plates and the second plates, respectively, into which both ends of the heat insulating connectors coupled therebetween are fitted, and the protruding fitting ends are formed to abut against and support the protruding side support ends of the rigid support members.

More preferably, the rigid support members further comprise gasket grooves 11*c*3, 21*c*3 to which elastic gaskets 12, 22 are coupled as air tightness blocking members in a direction opposite to the other symmetrically overlapping window chassis.

Advantageous Effects

According to the insulating structure and glass panel supporting structure of the window chassis at the center bar portion where the two-side support frame window chassis overlap each other in the sliding window of the present invention, through a heat insulating connector made of an elastic material coupled between the first plate and the second plate constituting the side elastic heat insulating support assembly that is slidably coupled to the inner extension support ends extending from the side chassis portions to the center bar portions, a basic heat insulation function can be obtained. In addition, the force for holding the glass panels from the side may be increased through the rigid support members provided to be simultaneously wedge-coupled to the first plate of the side elastic insulating support assemblies and the protruding edge portions of the side chassis portions.

In the sliding window system employing the structure according to the present invention, while maintaining good thermal insulation performance, at the same time, by increasing the force holding the glass panels from the side, it has a more stable deformation absorption capacity against the displacement or deformation of the glass panel support brackets (glass support insulation brackets made of flexible and soft material) generated by wind pressure. In addition, by allowing the width of displacement or deformation to be controlled within an appropriate range, it also provides the effect of securing more excellent stability by alleviating the risk that may be caused by excessive deformation.

MODES OF THE INVENTION

Hereinafter, embodiments that are easily performed by those skilled in the art will be described in detail with reference to the accompanying drawings. However, the embodiments of the present invention may be achieved in several different forms and are not limited to the embodiments described herein.

As described above, in the sliding window improved to increase the openness of the windows, the present invention provides new window chassis insulating structure and glass panel supporting structure at the center bar portion where the two-side support frame window chassis having a relatively narrow frame width compared to the four-side support window chassis, overlap each other. According to a preferred embodiment of the present invention illustrated through the drawings shown in the accompanying drawings FIGS. 5*a* to 6*e*, glass panels 10*g*, 20*g* forming a fixed window 10 or a movable window 20 constituting the sliding window supports only both sides of the chassis with an aluminum chassis, and a structure is provided in that rollers are directly coupled to the lower glass support insulation brackets without an aluminum chassis at the lower portions of the glass panels 10*g* and 20*g*, so that they slide along roller guide rails on the window frame 100.

Figure 1A:
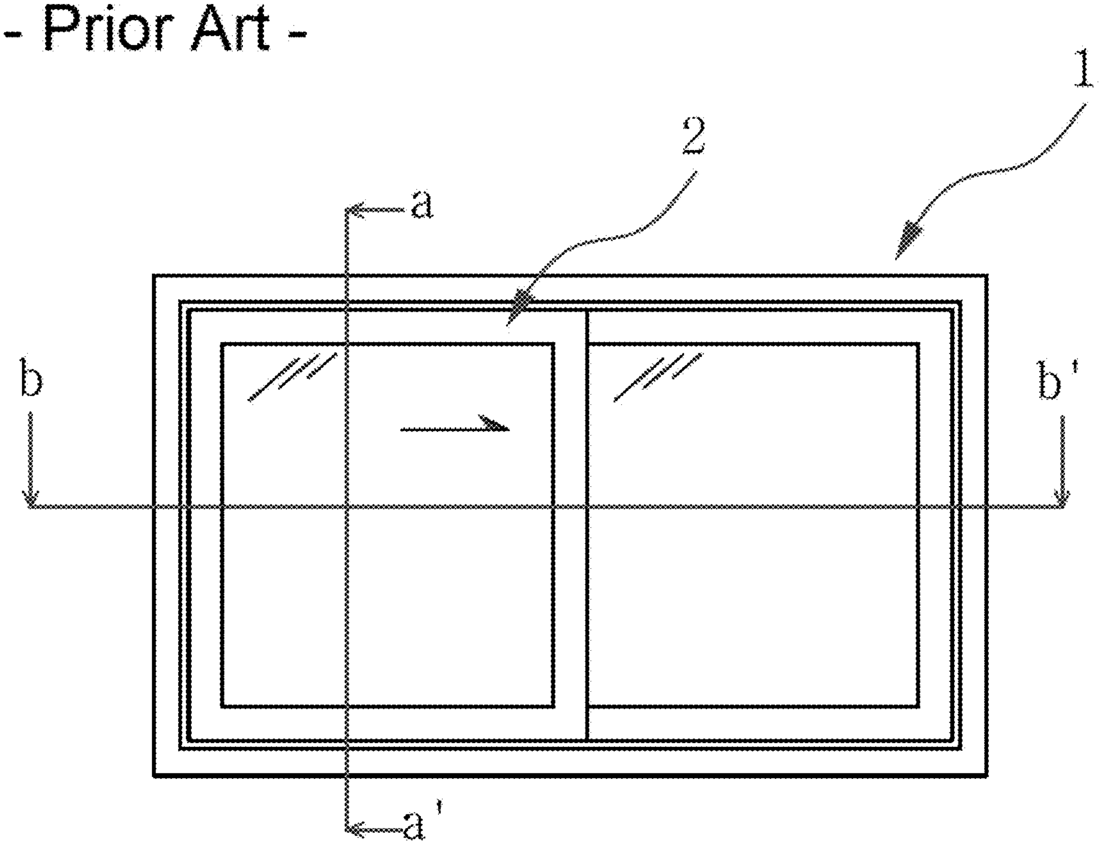
FIGS. 1*a* to 1*c* are views showing a conventional general sliding window system, showing a sliding window having a window chassis supporting glass at four sides.
Figure 1B:
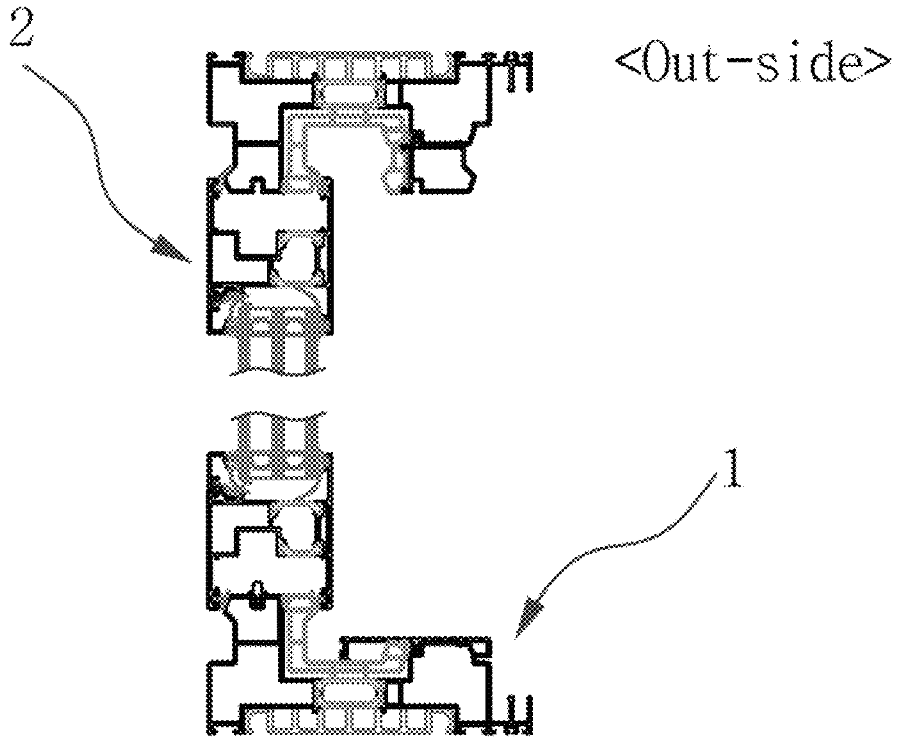
Figure 1C:
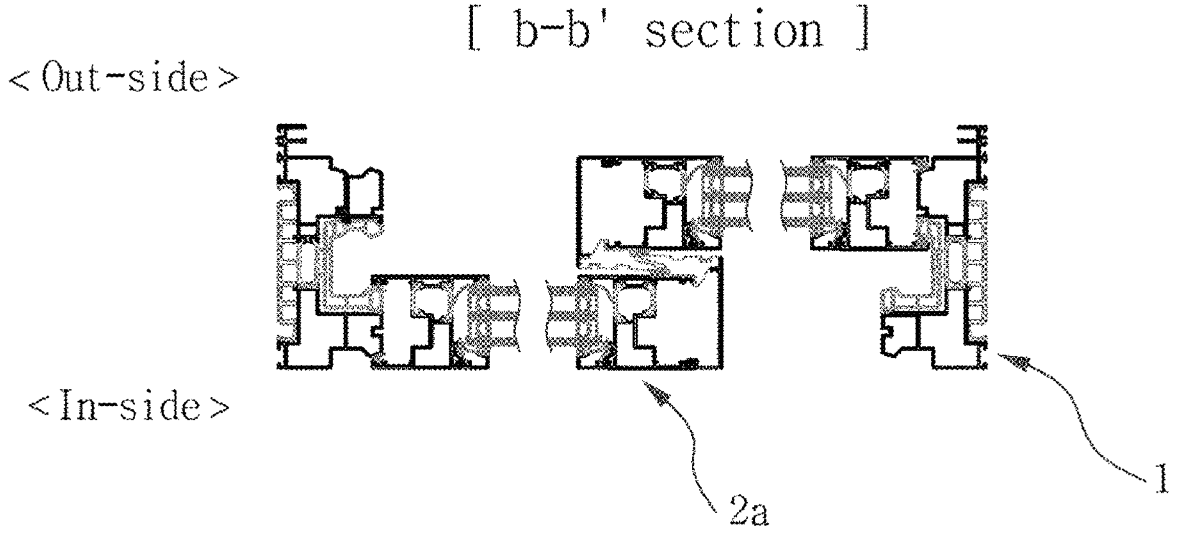
Figure 2A:
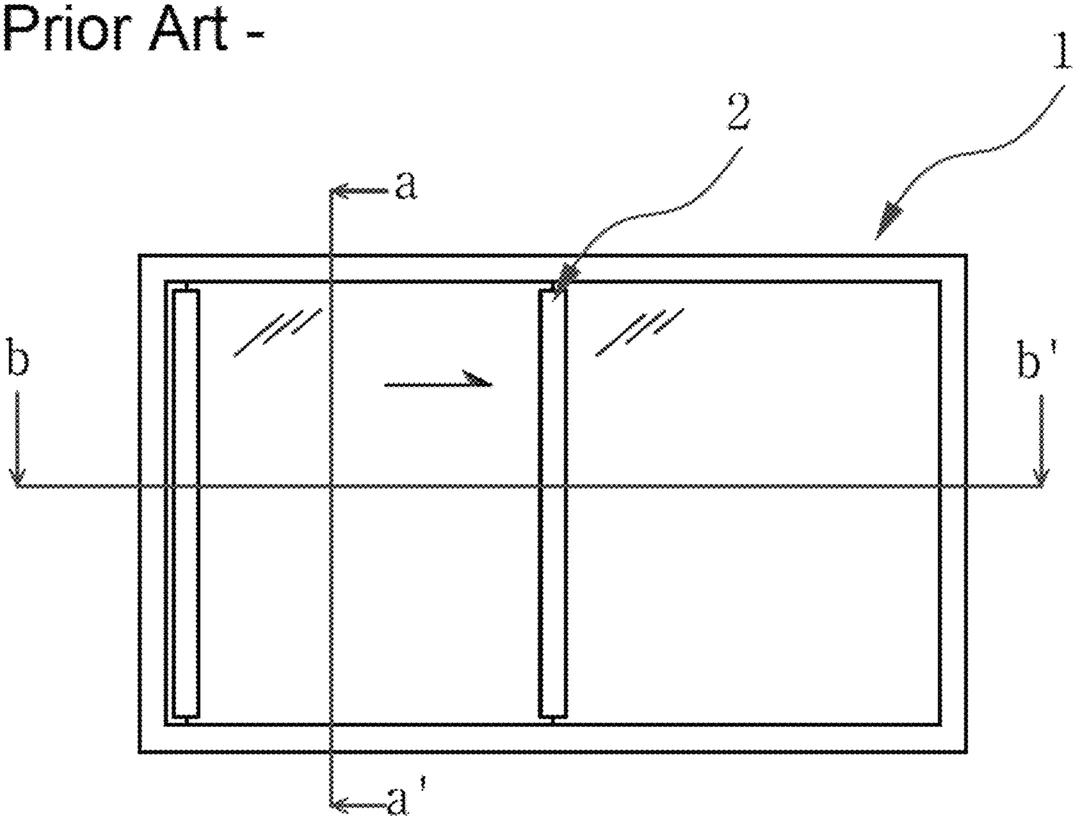
FIGS. 2*a* to 2*d* are views showing sliding windows improved from the general sliding window system shown in FIGS. 1*a* to 1*c*, and the openness of the windows is emphasized in this improvement. Theses drawings are a schematic view showing an example of a sliding window installation structure in which the two-side supporting frame supports only both sides of the glass panels constituting the sliding windows (two-side supporting windows type) and glass is directly placed on the upper part of the roller without an aluminum window chassis under the lower part of the sliding window.
Figure 2B:
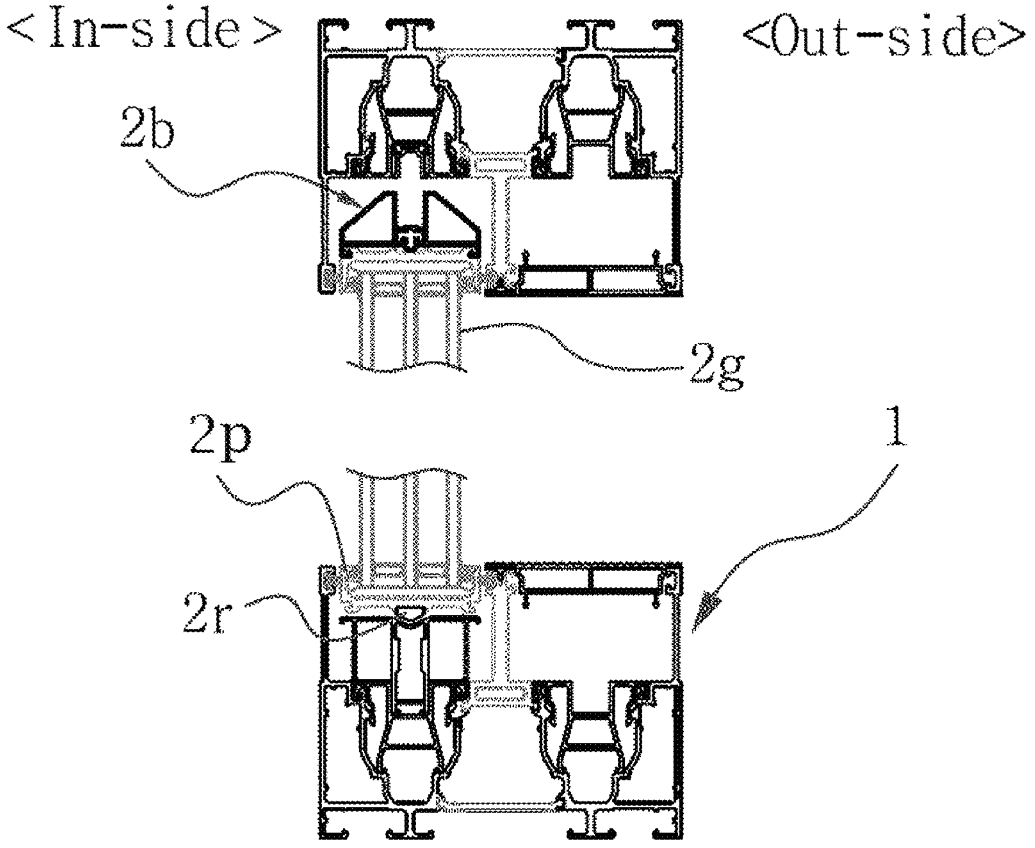
Figure 2C:
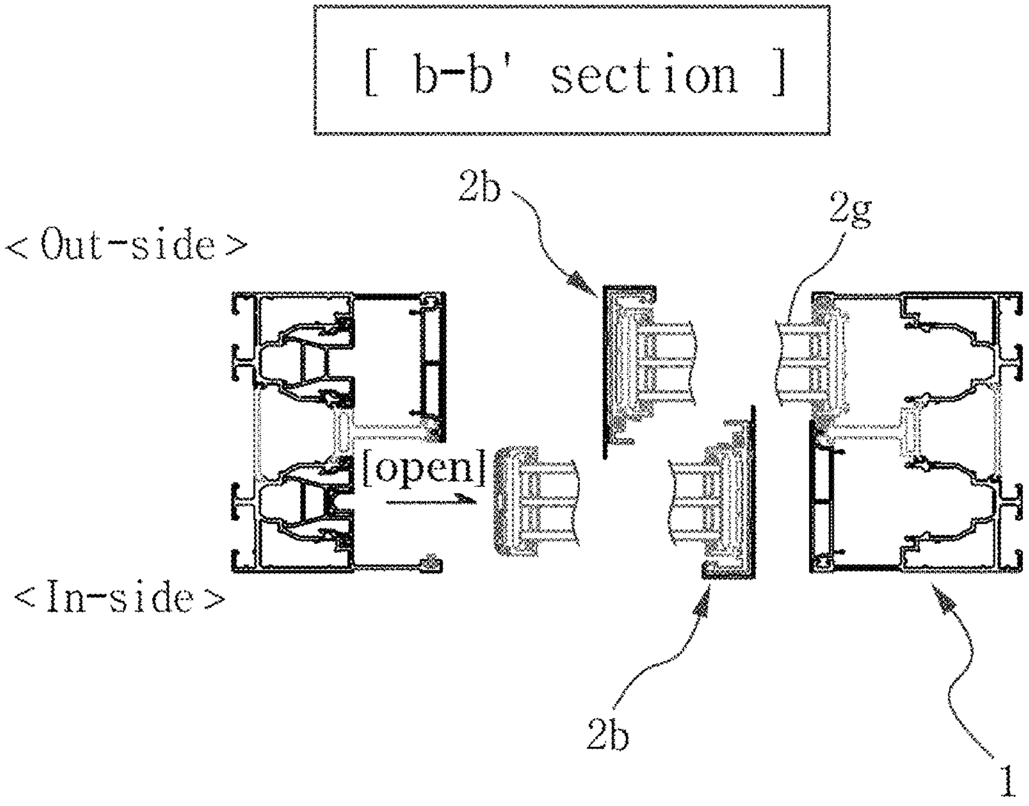
Figure 2D:
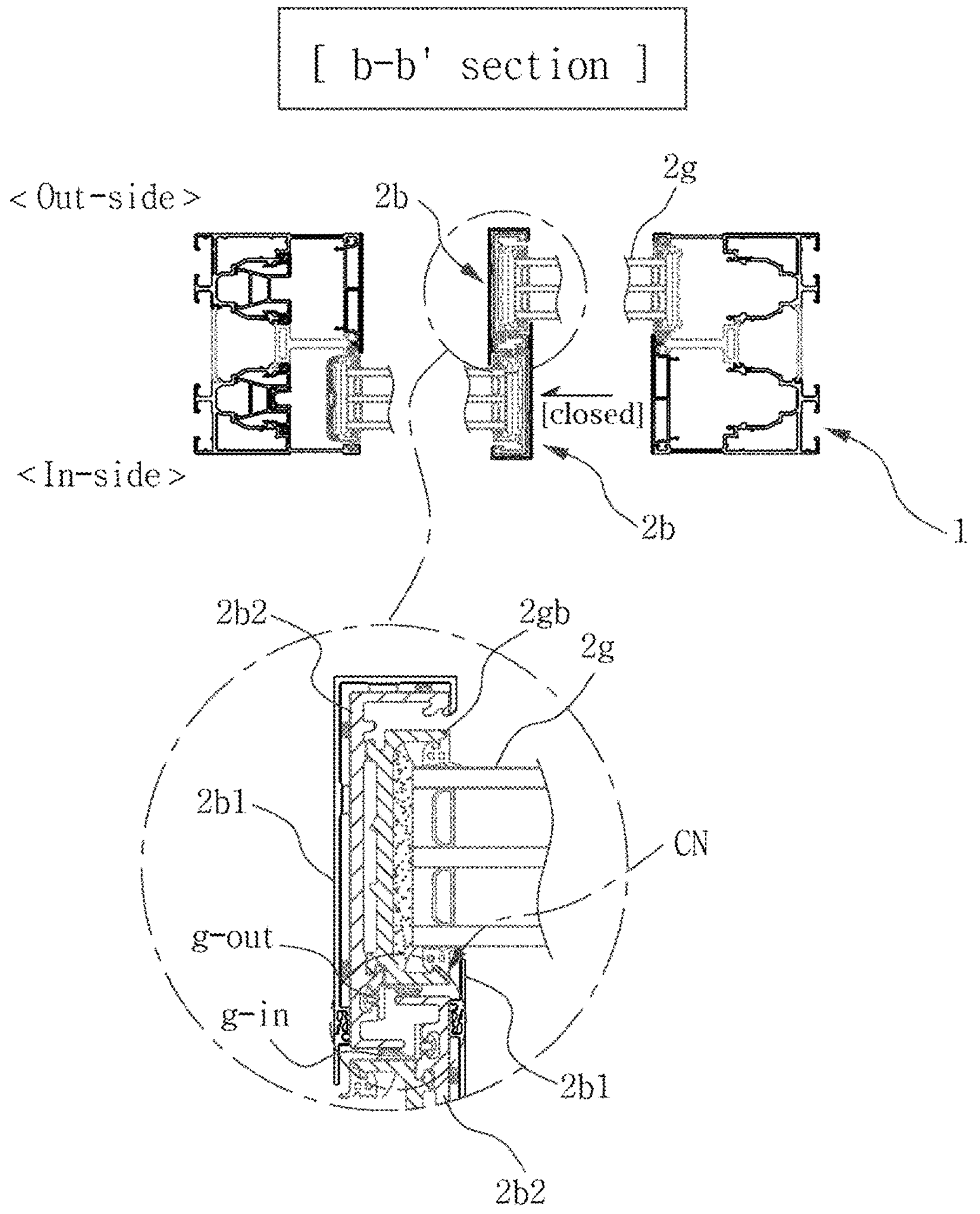
Figure 3A:
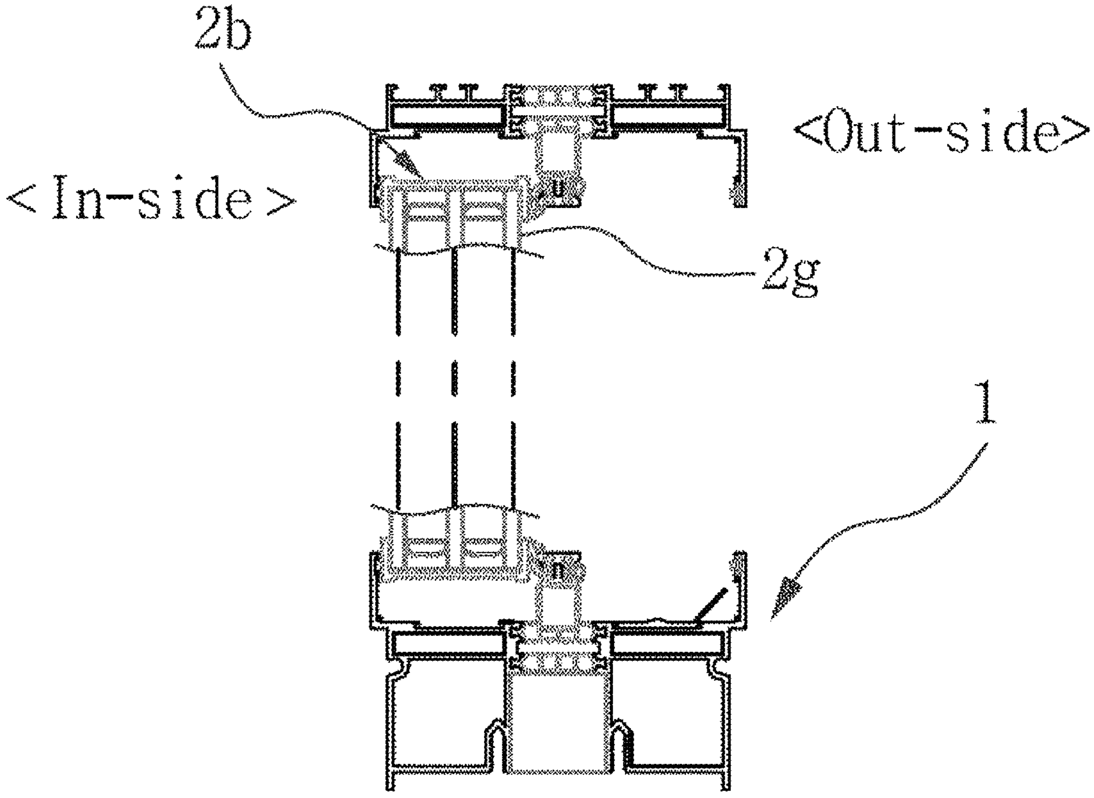
FIGS. 3*a* to 3*e* are views showing another example of a sliding window of a two-side supporting frame window type.
Figure 3B:
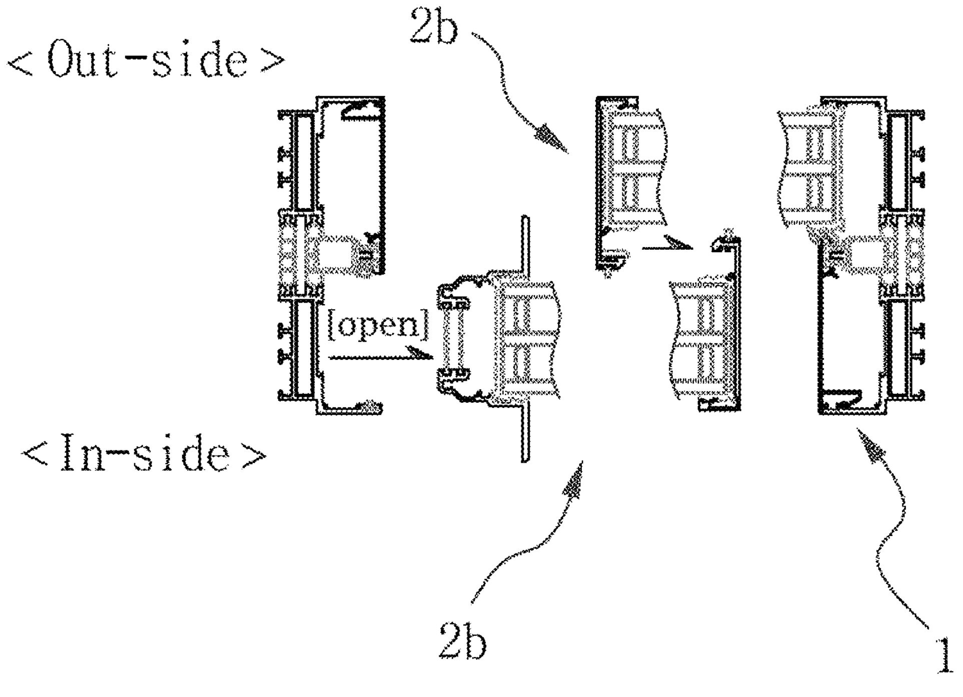
Figure 3C:
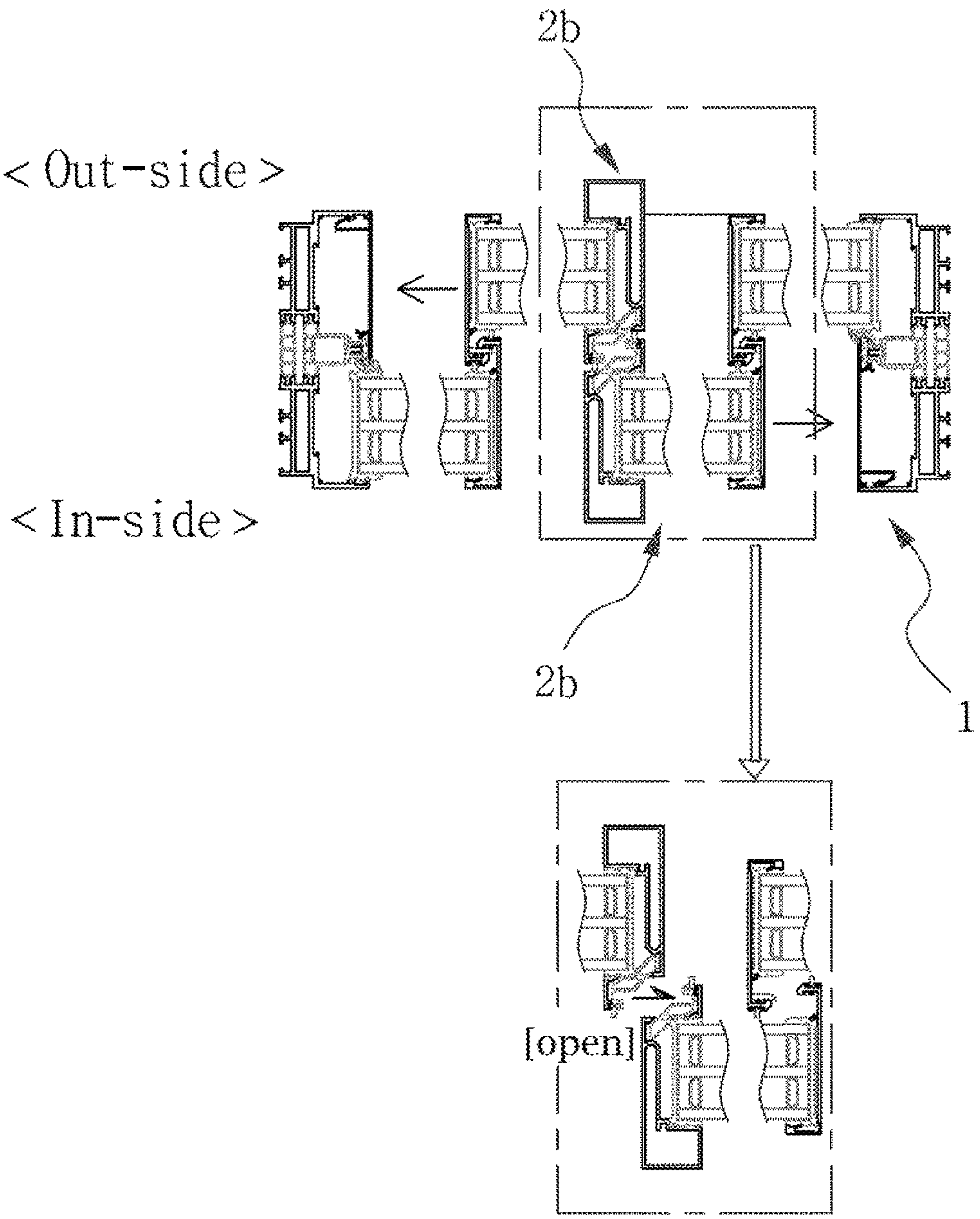
Figure 3D:
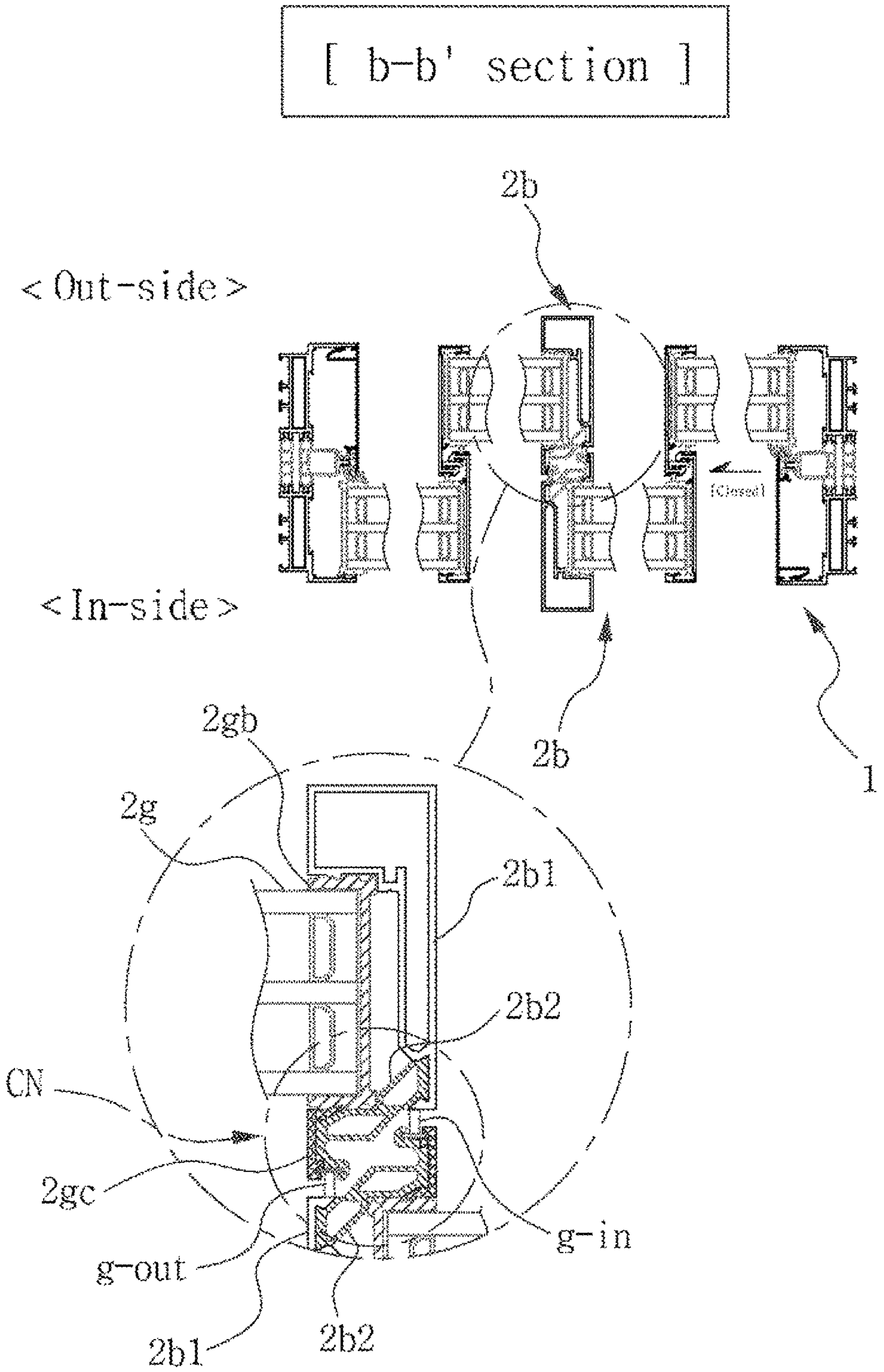
Figure 3E:
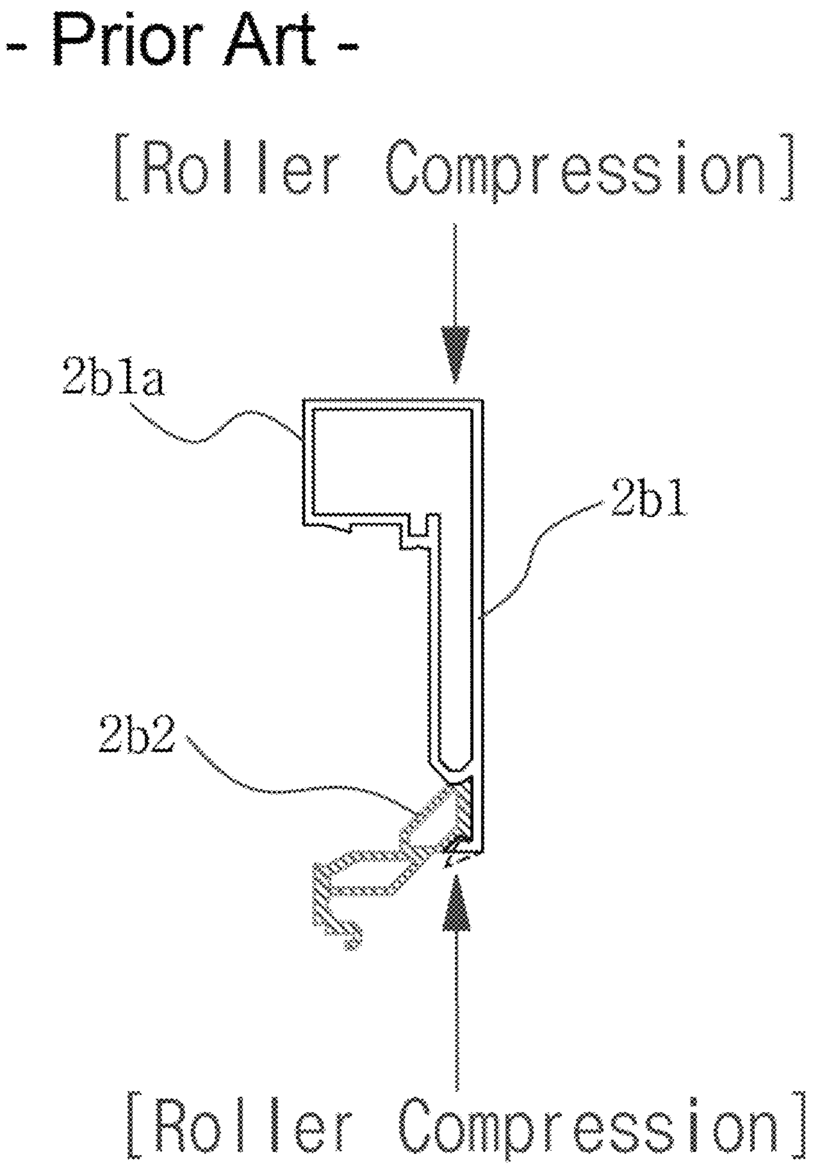
Figure 4A:
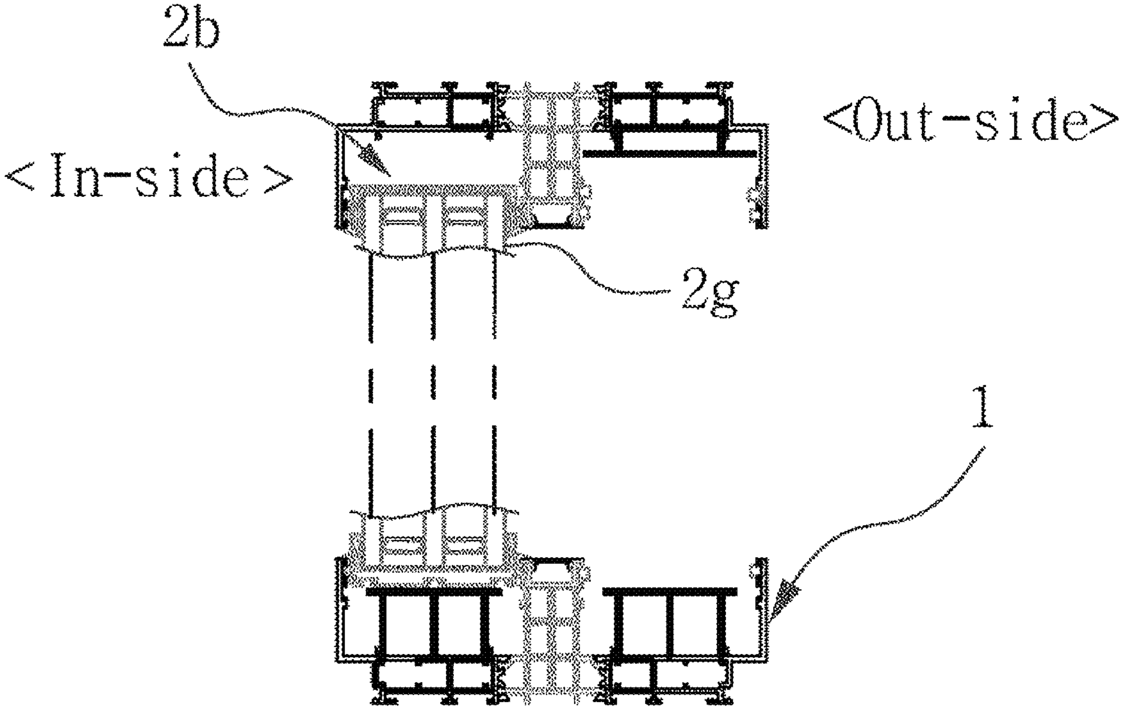
FIGS. 4*a* to 4*c* are views showing additional example for two-side supporting frame window type.
Figure 4B:
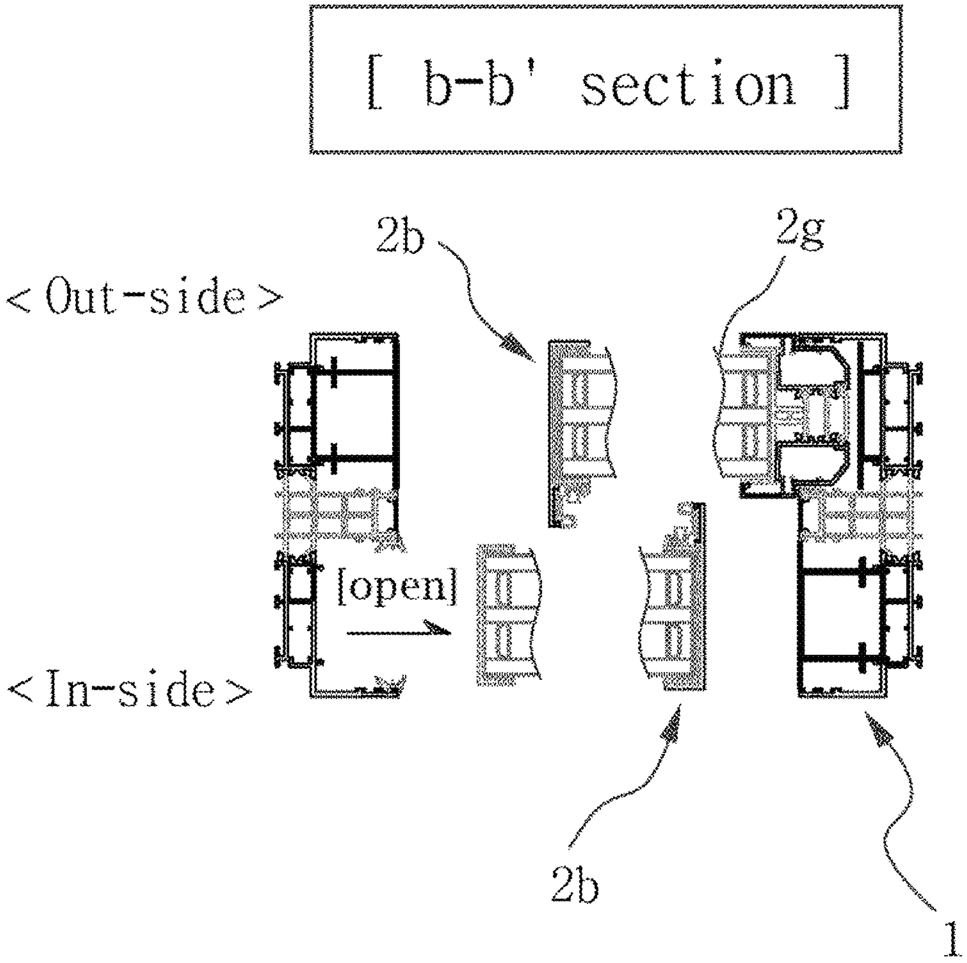
Figure 4C:
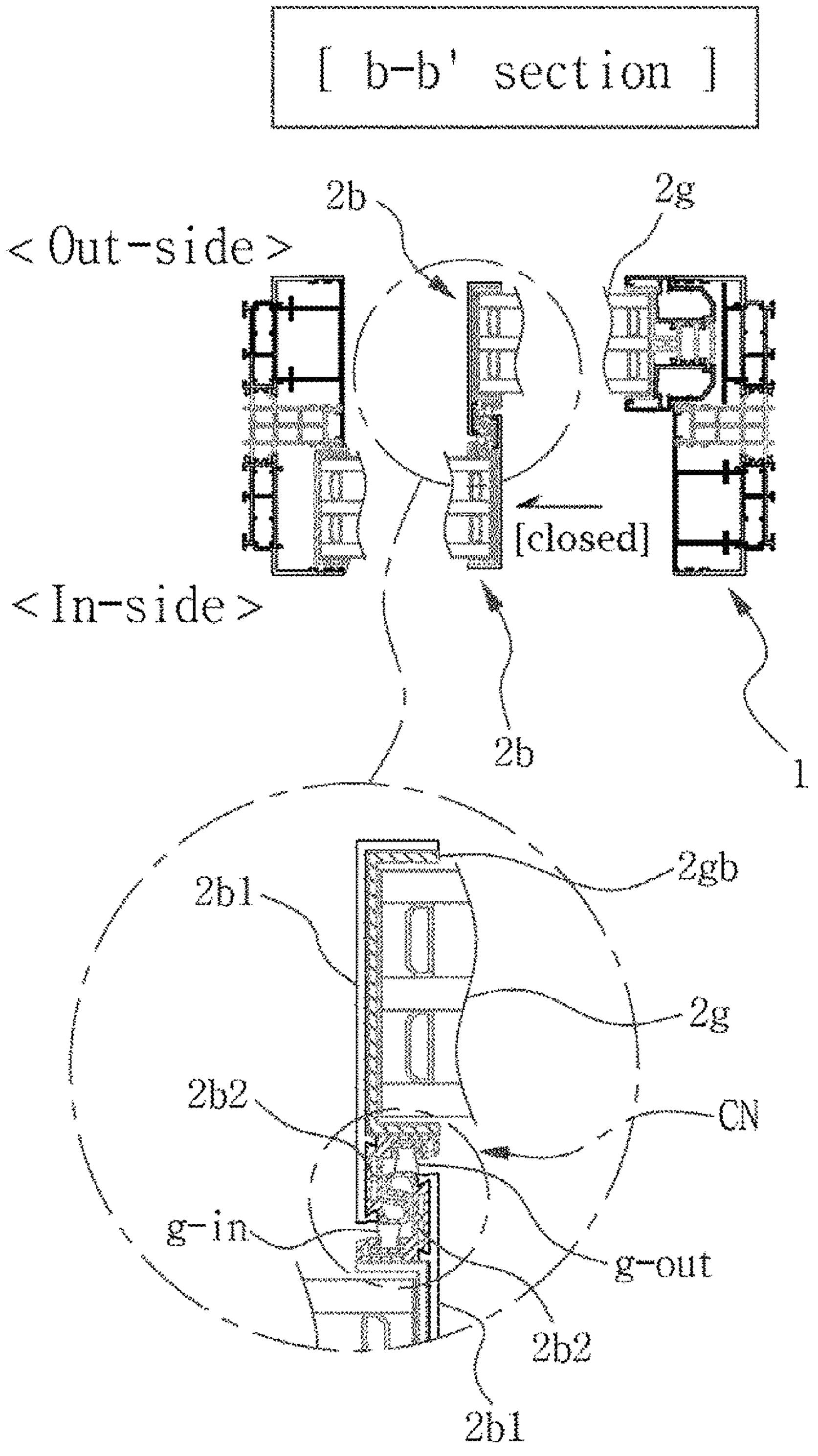
Figure 5A:
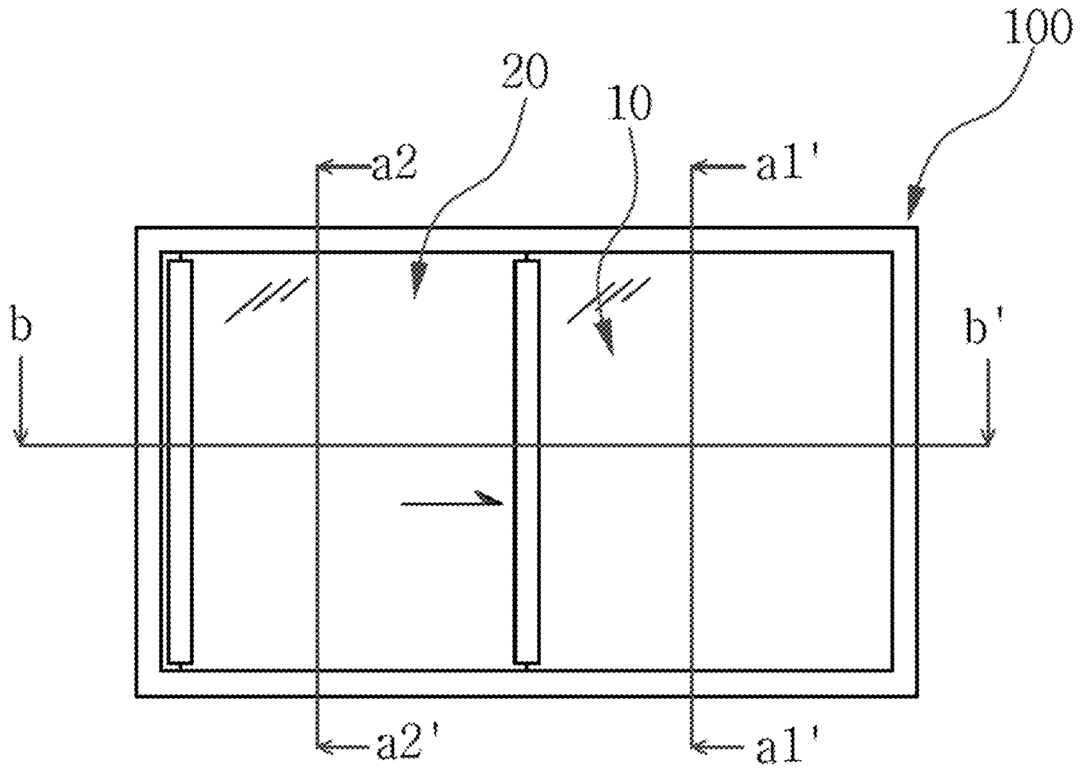
FIG. 5*a* is a front view showing a sliding window installation structure (insulating structure and glass panel supporting structure of a window chassis at a center bar portion where two side support frame window chassis overlap each other) according to the present invention.
Figure 5B:
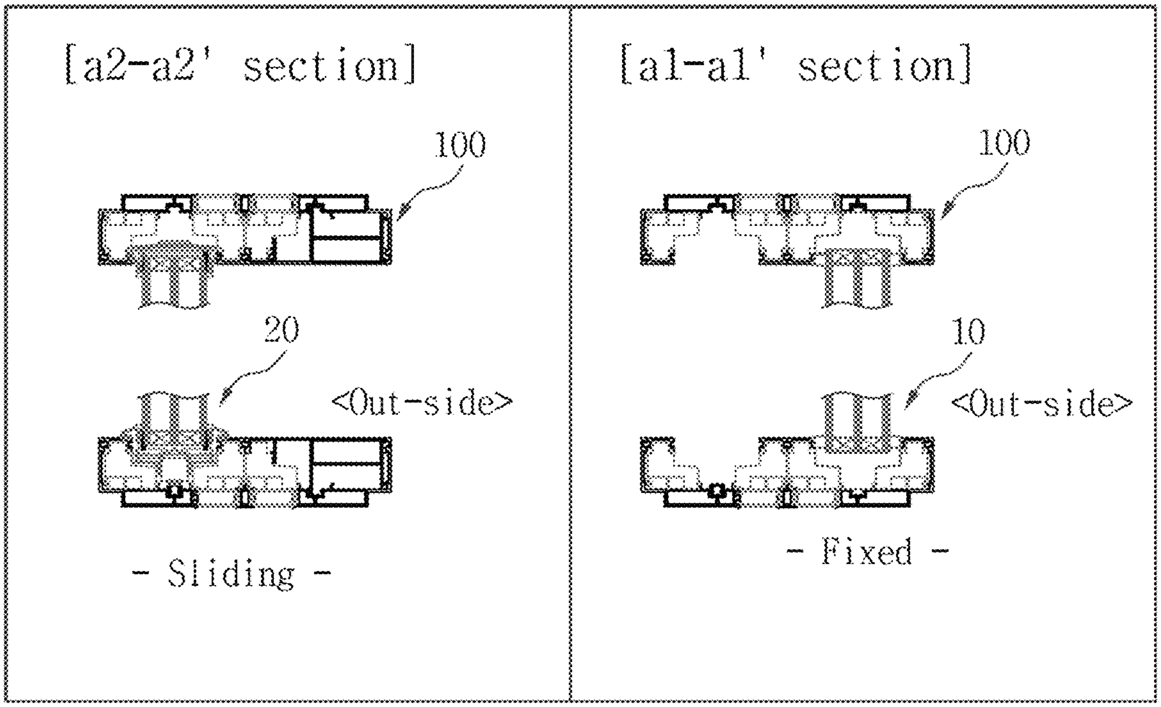
FIG. 5*b* shows a cross-sectional view along line a1-a1' of FIG. 5*a* and a cross-sectional view along line a2-a2' of FIG. 5*a*.
Figure 5C:
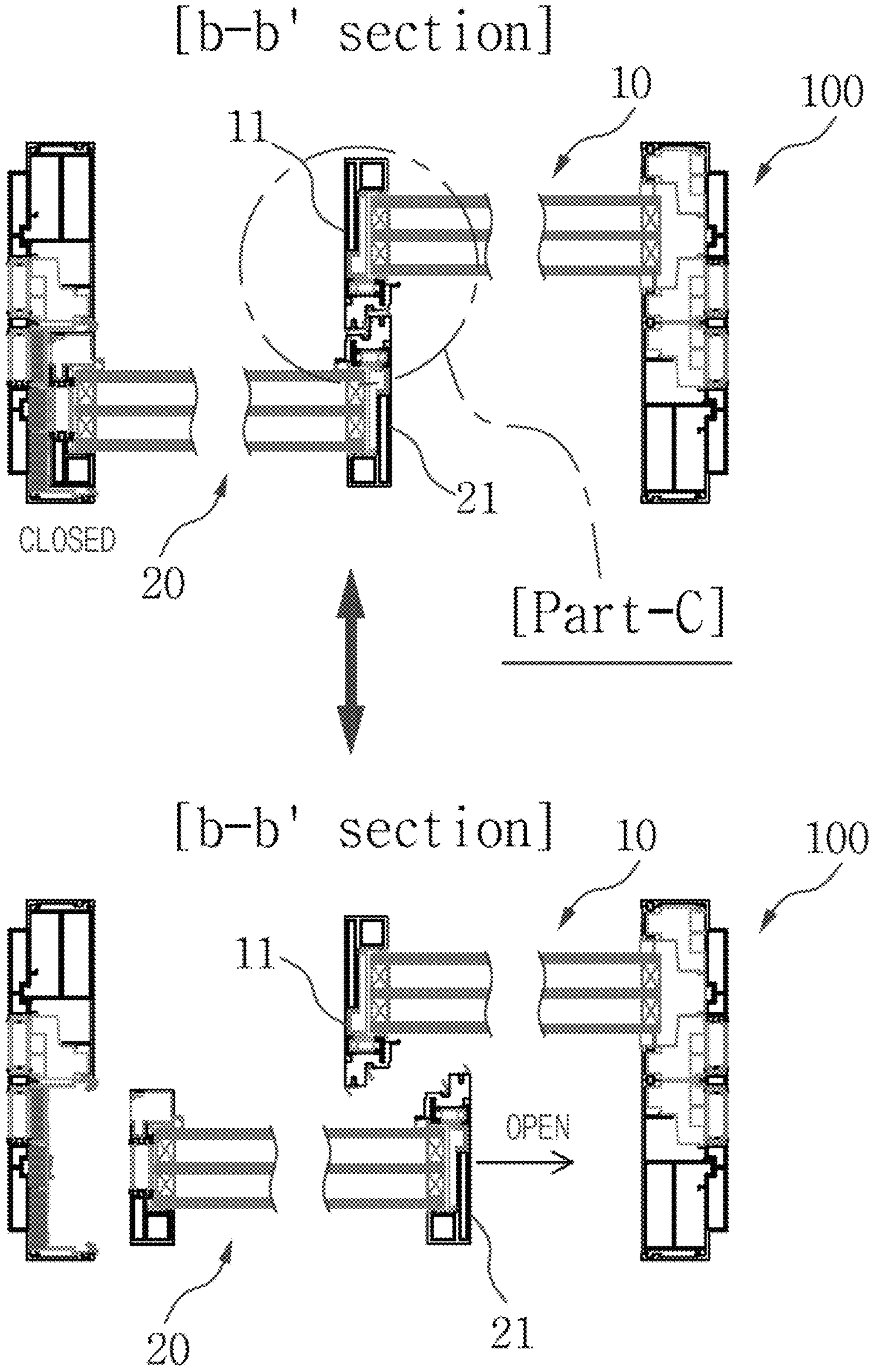
FIG. 5*c* is a cross-sectional view taken along line b-b' of FIG. 5*a*, and is a view showing a change operation between an open state and a closed state of the sliding window.
Figure 5D:
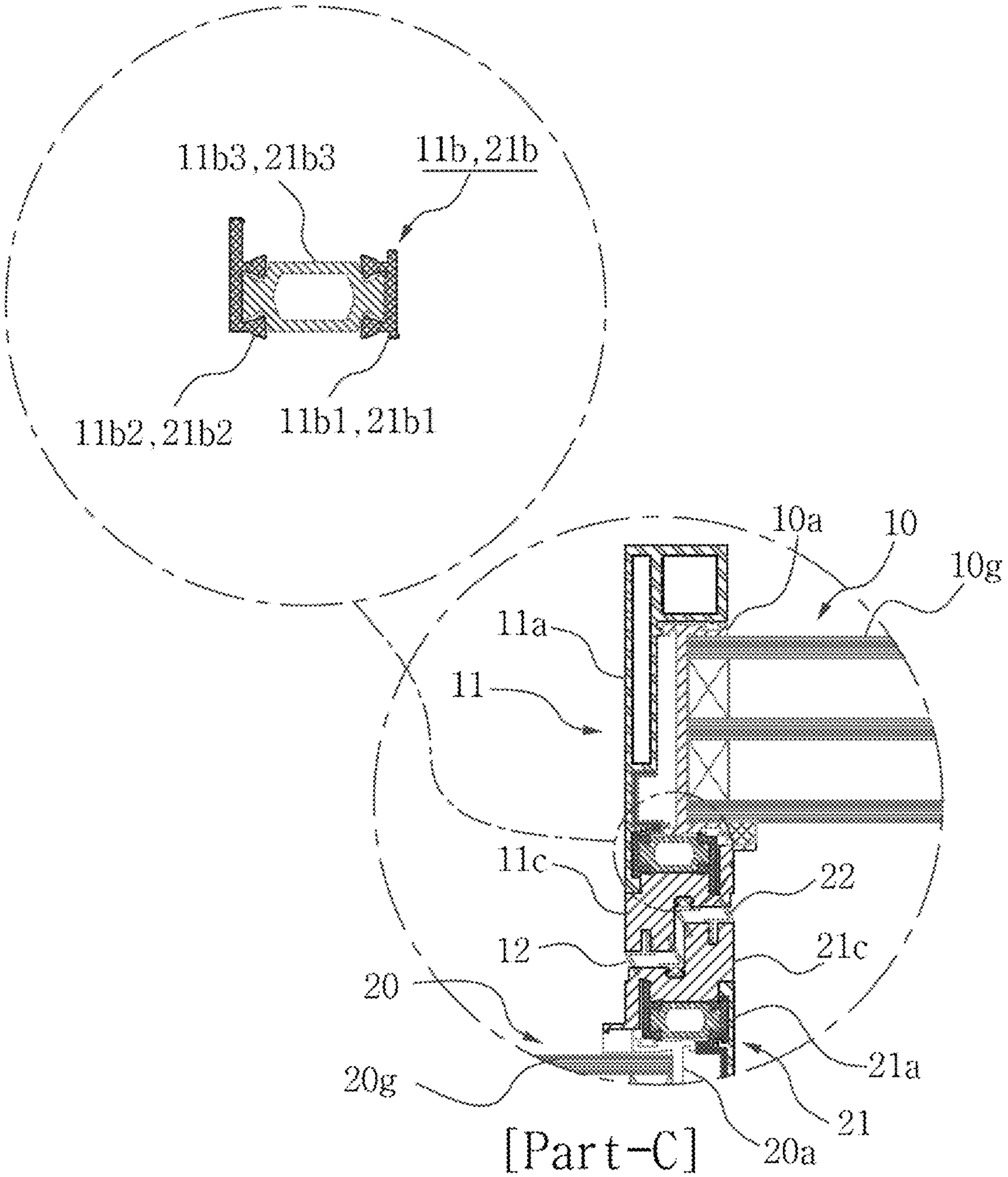
FIG. 5*d* is an enlarged view of [Part-C] of FIG. 5*c*.

According to such a preferred embodiment of the present invention, when the sliding windows 10 and 20 in the sliding window system of the two-side supporting frame window type are closed (the state of the upper figure in FIG. 5*c*), a structure for insulating and supporting glass panels of the window chassis 11 and 21 at the center bar portion ([Part-C]) where the two-side support frame window chassis 11 and 21 overlap each other, is provided, the window chassis insulating structure and glass panel supporting structure comprises, as shown in FIG. 5*c* and FIG. 5*d* which are enlarged views of its main part, glass support insulation brackets 10*a*, 20*a* attached to a side of each of glass panels 10*g*, 20*g;* side chassis portions 11*a*, 21*a* made of an aluminum material provided to support the glass support insulation brackets 10*a*, 20*a* from inner and outer surfaces;

protruding edge portions 11*ae*, 21*ae* and first fitting slots 11*a*1*s*, 21*a*1*s* provided on inner extension support ends 11*a*1, 21*a*1 extending from the side chassis portions 11*a*, 21*a* to the center bar portions;

side elastic insulating support assemblies 11*b*, 21*b* comprising a first plates 11*b*1, 21*b*1 slidably coupled to the first fitting slots 11*a*1*s*, 21*a*1*s*: a second plates 11*b*2, 21*b*2 disposed to be spaced apart from the first plates 11*b*1, 21*b*1 in a side direction of the glass panels and provided to support the side surface of the glass support insulation brackets 10*a*, 20*a*: and heat insulating connectors 11*b*3, 21*b*3 of elastic material coupled between the first plates 11*b*1, 21*b*1 and the second plates 11*b*2, 21*b*2; and rigid support members 11*c*, 21*c* formed to be additionally fitted in a wedge manner into the first plates 11*b*1, 21*b*1 of the side elastic insulating support assemblies 11*b*, 21*b* and, at the same time, into the protruding edge portions 11*ae*, 21*ae* of the side chassis portions 11*a*, 21*a,* wherein the rigid support members 11*c*, 21*c* being provided as a reinforced synthetic resin material in a symmetrical direction in which the window chassis 11, 21 overlap each other on the side surfaces of the side elastic insulation support assemblies 11*b*, 21*b*, respectively, in order to control displacement or deformation width of the side elastic insulating support assemblies 11*b*, 21*b* so as to increase force holding the glass panels 10*g*, 20*g* at side while maintaining the thermal insulation performance.

Herein, the rigid support members 11*c*, 21*c* preferably comprise; fitting slots 11*c*1*s*, 21*c*1*s* into which extended ends 11*b*2*a*, 21*b*2*a* of the second plates 11*b*2, 21*b*2 of the side elastic insulating support assemblies 11*b*, 21*b* are fitted and coupled; step edge portions 11*c*1*e*, 21*c*1*e* engaged with the protruding edge portions 11*ae*, 21*ae* provided on inner extension support ends 11*a*1, 21*a*1 extending from the side chassis portions 11*a*, 21*a* to the center bar portions; and protruding side support ends 11*c*1, 21*c*1 between the fitting slots 11*c*1*s*, 21*c*1*s* and the stepped edge portions 11*c*1*e*, 21*c*1*e*.

Figure 6A:
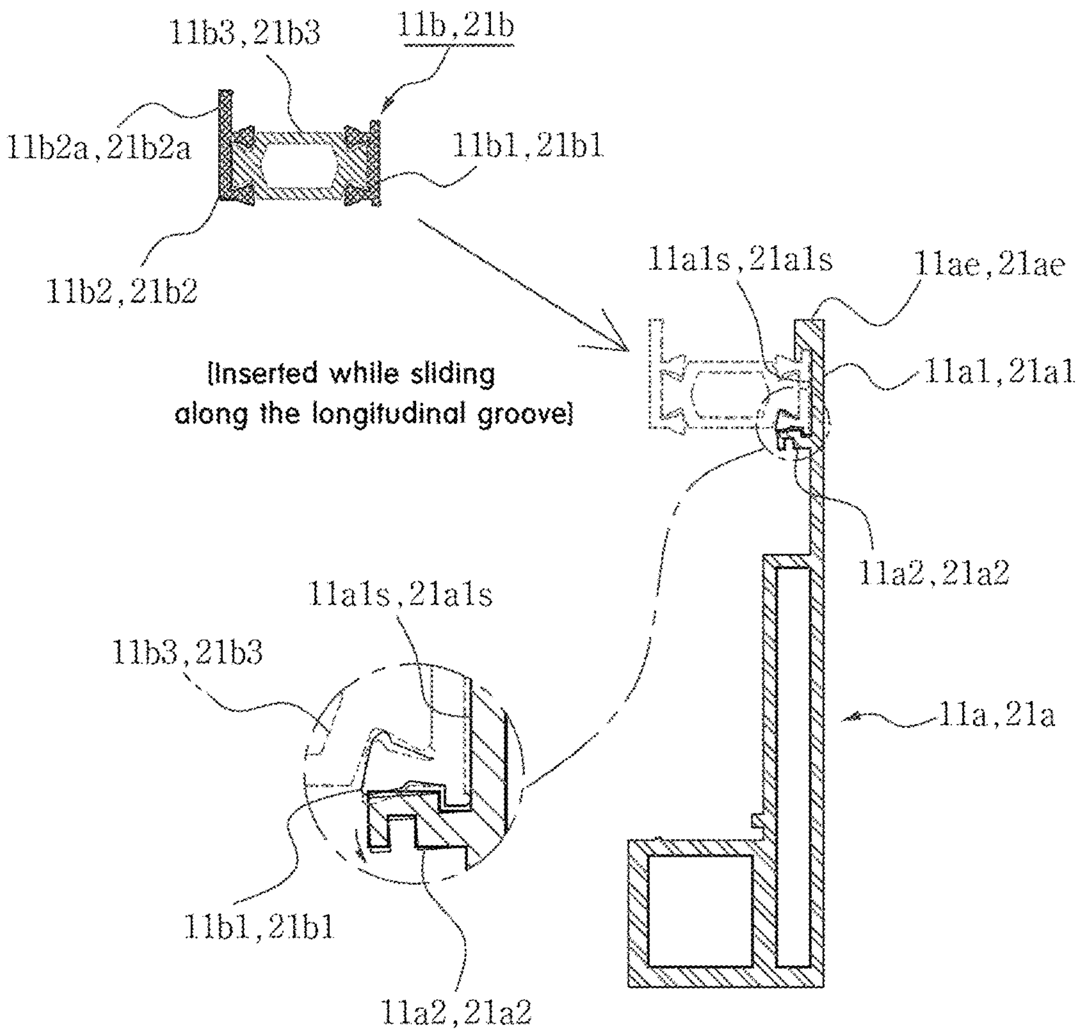
FIGS. 6*a* to 6*e* show step-by-step diagrams in which the insulating structure of the window chassis and the glass panel support structure are assembled in stages at the center bar portion where the two-side support frame window chassis overlap each other in order to achieve the sliding window installation structure according to the present invention.
Figure 6B:
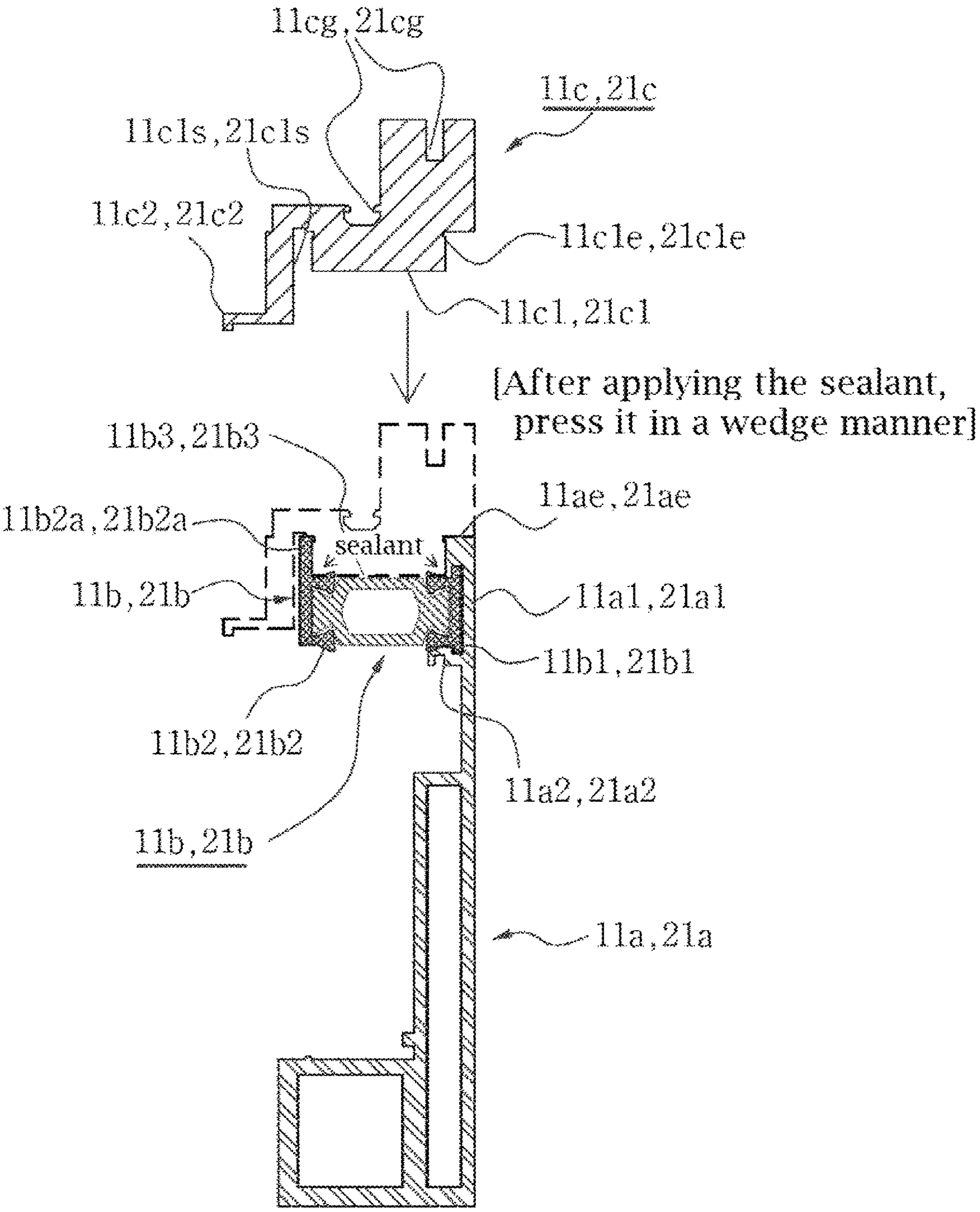
Figure 6C:
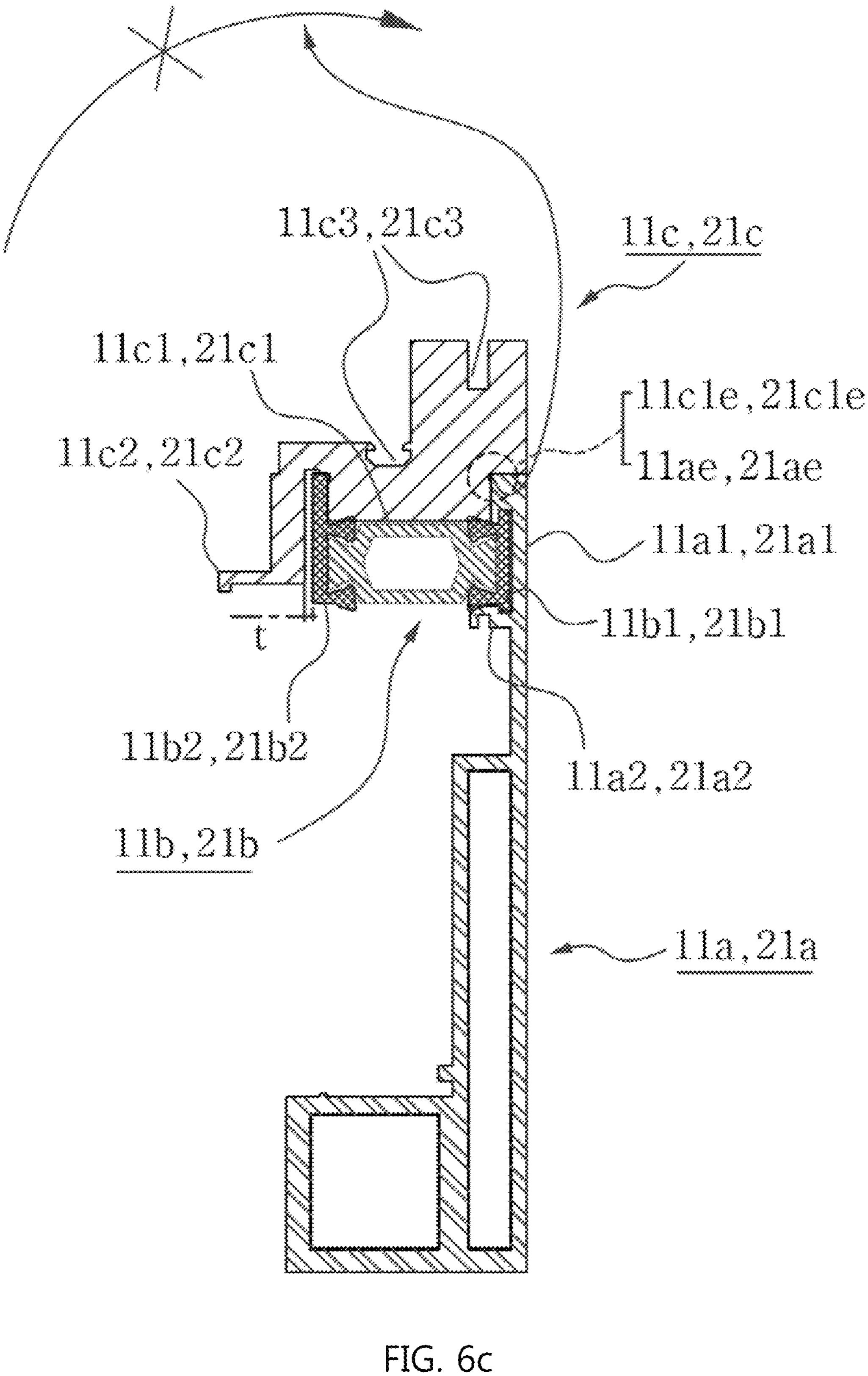

On the other hand, as shown in FIG. 6*c*, a certain gap t of clearance is maintained between the fitting slots 11*c*1*s*, 21c1s and the extended ends 11b2a, 21b2a of the second plates 11b2, 21b2 of the side elastic insulation support assemblies 11b, 21b, whereby enabling a certain range of elastic movement or deformation of the second plates 11b2, 21b2, and elastically supporting the side surfaces of the glass support insulation brackets 10a, 20a supporting the glass panels within a set displacement or deformation range. Therefore, it becomes possible to alleviate deformation or damage so that glass breakage can be prevented.

In addition, protruding fitting ends are provided on opposite surfaces of the first plates 11b1, 21b1 and the second plates 11b2, 21b2, respectively, into which both ends of the heat insulating connectors 11b3, 21b3 coupled therebetween are fitted, and the protruding fitting ends (both sides rolling pressing process may be performed for a strong bond) are formed to abut against and support the protruding side support ends 11c1, 21c1 of the rigid support members 11c, 21c.

Preferably, the rigid support members 11c, 21c further comprise gasket grooves 11c3, 21c3 to which elastic gaskets 12, 22 are coupled as air tightness blocking members in a direction opposite to the other symmetrically overlapping window chassis.

And the elastic gaskets 12, 22 serving as air tightness blocking members comprises fixed ends fitted into the gasket grooves 11c3, 21c3 and fixed to the sliding window; and elastically deformable ends elastically deformed outwardly in contact with the rigid support members of the other opposing window chassis.

On the other hand, the insulating and glass panel supporting structure of the window chassis 11 and 21 at the center bar portions ([Part-C]) where the two-side support frame window chassis 11 and 21 configured as described above overlap each other, is completed through the assembly steps shown in the drawings of FIGS. 6a to 6e and is implemented in the sliding window system.

Firstly, as shown in FIG. 6a, by inserting and assembling the first plates 11b1 and 21b1 of the side elastic insulation support assemblies 11b and 21b into the first fitting slots 11a1s, 21a1s on one surface of the inner extension support ends 11a1 and 21a1 of the side chassis portions 11a and 21a made of aluminum, in a sliding manner along the longitudinal groove, and the side ends of the first plates 11b1 and 21b1 are elastically deformed by the rear surfaces of the protruding edge portions 11ae and 21ae and the rear surfaces of the outer protruding ends 11a2 and 21a2 providing both jaws of the first fitting slots 11a1s and 21a1s, and therefore the first plates 11b1 and 21b1 are firmly fitted and fixed into the first fitting slots 11a1s and 21a1s.

After that, as shown in FIG. 6b, sealant is applied to one side of the side elastic insulating support assembly 11b and 21b, and the rigid support members 11c and 21c are press-fitted in a wedge manner to strengthen the side support and structurally make a symbol of '⊂' (channel type) complete.

Here, the second fitting slots 11c1s, 21c1s of the rigid supports 11c, 21c are plugged in and joined to the extension ends 11b2a, 21b2a of the second plates 11b2, 21b2 of the side elastic insulation support assemblies 11b, 21b, simultaneously the stepped edge portions 11c1e, 21c1e are engaged with the protruding edge portions 11ae, 21ae provided on the inner extension support ends 11a1, 21a1 extending from the side chassis portions 11a, 21a to the center bar portions, and the protruding side support ends 11c1, 21c1 are inserted into the space between the second fitting slots 11c1s, 21c1s and the stepped edge portions 11c1e, 21c1e, thereby in a state in which the stepped edge portions 11c1e, 21c1e and the protruding edge portions 11ae, 21ae are pressed in a wedge manner by corner engagement, rotation or deformation of the rigid support members 11c, 21c in the direction indicated by arrows as shown at the top of the FIG. 6c is strongly prohibited. In this way, while forming one strong support structure to the outside, meanwhile to the inside, the extension ends 11b2a, 21b2a of the second plates 11b2, 21b2 of the side elastic insulating support assemblies 11b, 21b are fitted into the second fitting slots with an appropriate clearance t, it is possible to solve the assembly tolerance problem. As well as, even when the continuous strong wind exerts pressure on the glass panels 10g, 20g, the glass panels 10g and 20g and the glass support insulation brackets 10a and 20a supporting them can elastically absorb this displacement even in a situation in which displacement must occur within a set range.

In addition, the first plates 11b1, 21b1 and the second plates 11b2, 21b2 of the elastic insulating support assemblies 11b, 21b are made of an aluminum material so as to have a predetermined rigidity and elasticity necessary for a function as a glass panel supporting. It is also made possible to prevent heat loss (blocking heat flow) by the insulating connectors 11b3, 21b3 made of an elastic material that interconnects them in the middle.

Figure 6D:
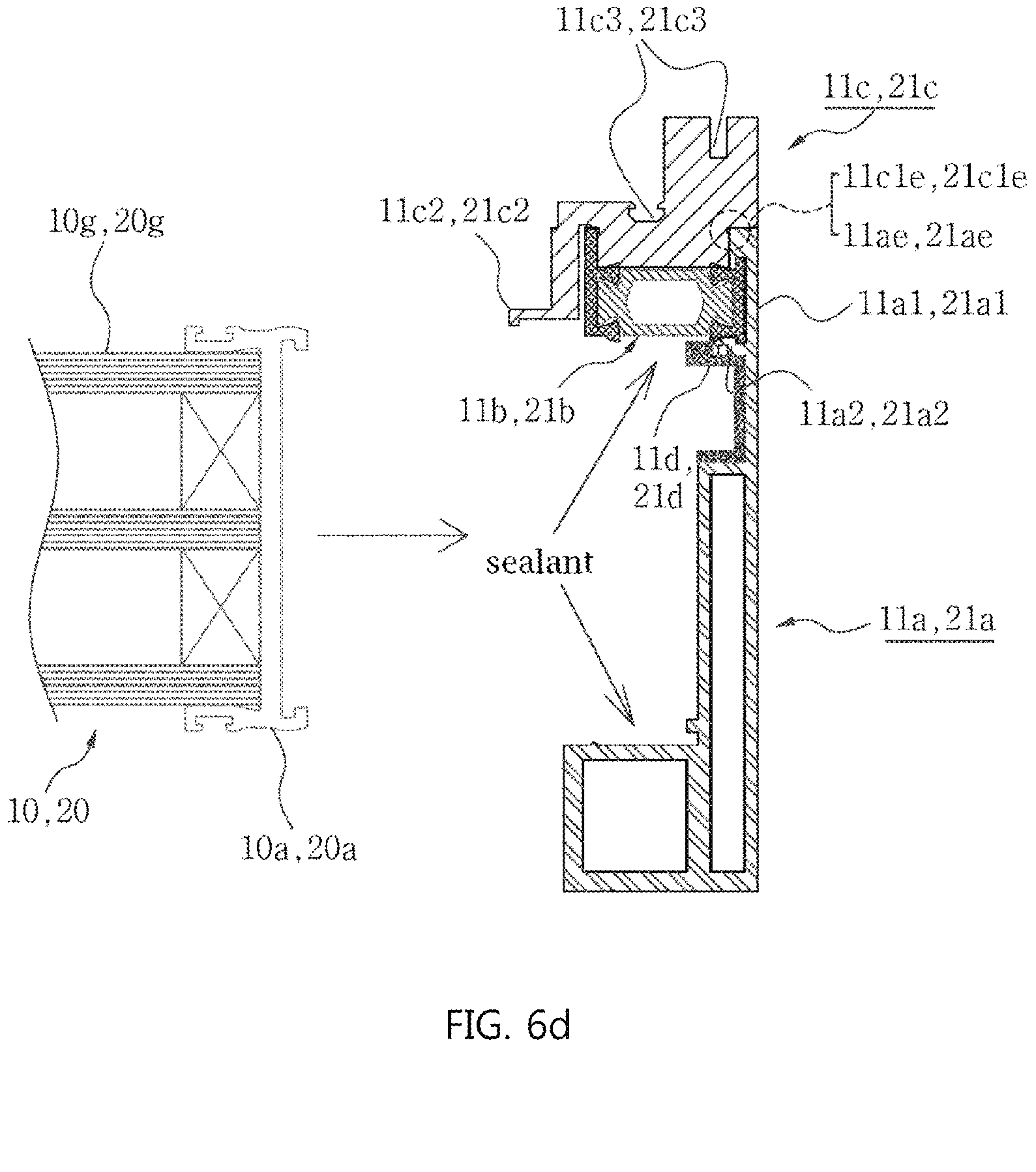
Figure 6E:
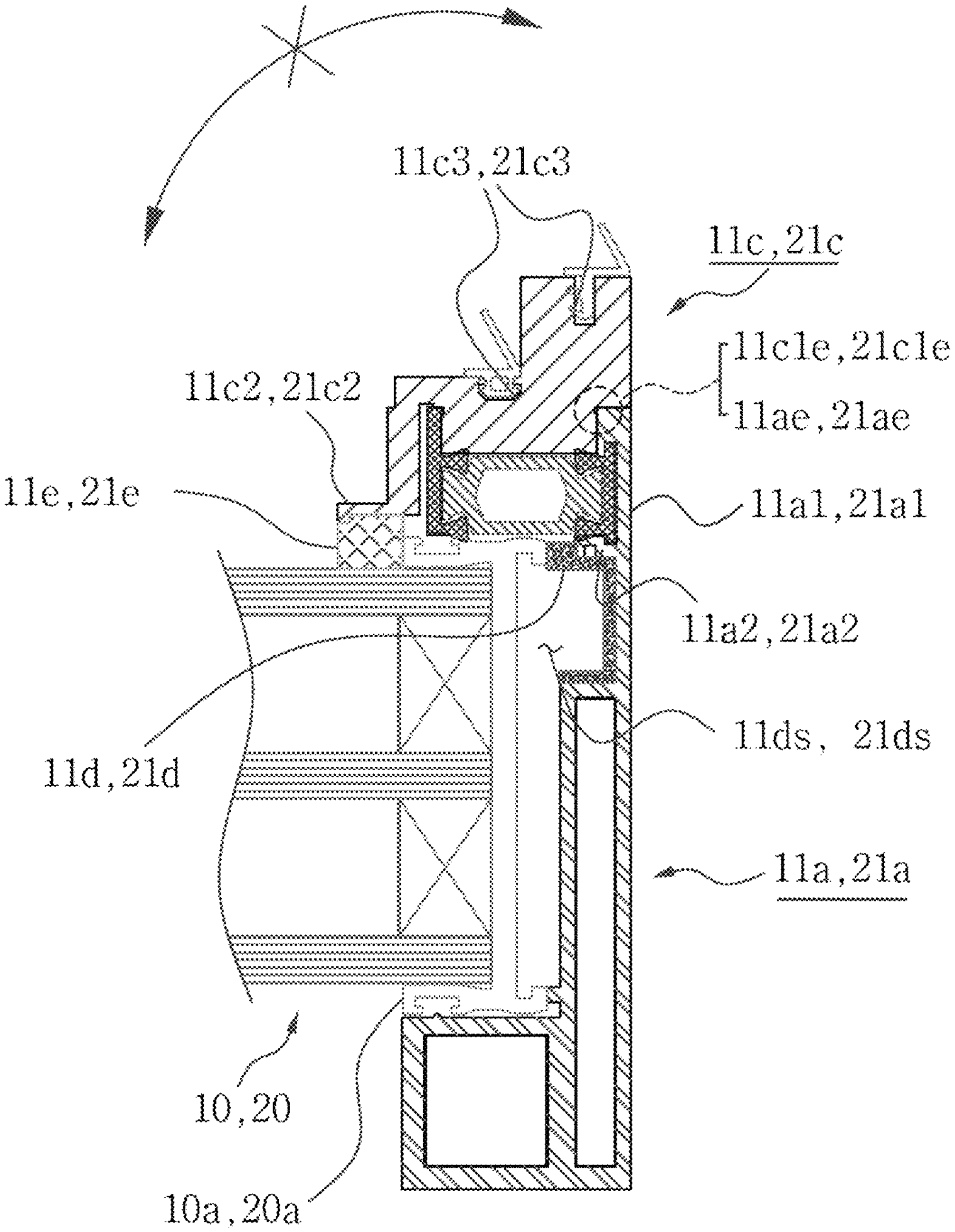

As shown in FIG. 6d in the state of FIG. 6c, in concave portions adjacent to outer protruding ends 11a2, 21a2 forming the first fitting slots 11a1s, 21a1s on one surface of the inner extension support ends 11a1 and 21a1 of the side chassis portions 11a and 21a, left and right height correction insulation supports 11d, 21d are provided so as to provide a heat insulation function while supporting the glass support insulation brackets 10a, 20a at the same height from the inside and the outside, after additionally applying the sealant, the glass supporting insulation brackets 10a, 20a supporting the glass panels 10g, 20g are fitted together with the glass panels 10g, 20g. At this time, the inner spaces 11ds, 21ds are filled with silicon, and in addition, second protruding side support ends 11c2, 21c2 are provided in the rigid support members 11c and 21c as shown in FIG. 6e. The finishing work is completed by additionally extending and providing foam rubber insulating gaskets 11e and 21e between the second protruding side support ends 11c2 and 21c2 and the glass panels 10g and 20g. Thereby, the rotation of the rigid support members 11c, 21c in a direction opposite to the direction of the arrow in FIG. 6d (rotation in the opposite direction to the rotation prevented in FIG. 6d) is also controlled and prevented by the assembled glass panels 10g, 20g and the glass supporting insulation brackets 10a, 20a, the stability of the entire device can be further supplemented and maintained.

In the above, while describing in detail a preferred embodiment of the present invention is applied to window having a pair of glass in which a plurality of glass panels 10g, 20g are formed by overlapping each other by bonding with a predetermined interval and a sealing member there between to realize a vacuum in the gap. However, it should be understood that the terms of glass panels are not to be constructed as limiting the scope of the present invention, and various modifications and improvements by those skilled in the art using the basic concept of the present invention defined in the following claims are also within the scope of the present invention.

The invention claimed is:

1. A window chassis insulating structure and glass panel supporting structure of two-side support frame window chassis (11, 21) at center bar portions where the two-side support frame window chassis (11, 21) overlap each other when a sliding window (10, 20) is closed, in a sliding window system, the window chassis insulating structure and glass panel supporting structure comprises, glass support insulation brackets (10*a*, 20*a*) attached to a side of each of glass panels 10*g*, 20*g*);

side chassis portions (11*a*, 21*a*) made of an aluminum material provided to support the glass support insulation brackets (10*a*, 20*a*) from inner and outer surfaces;

protruding edge portions (11*ae*, 21*ae*) and first fitting slots (11*a*1*s*, 21*a*1*s*) provided on inner extension support ends (11*a*1, 21*a*1) extending from the side chassis portions (11*a*, 21*a*) to center bar portions;

side elastic insulating support assemblies (11*b*, 21*b*) comprising first plates (11*b*1, 21*b*1) slidably coupled to the first fitting slots (11*a*1*s*, 21*a*1*s*), second plates (11*b*2, 21*b*2) disposed to be spaced apart from the first plates (11*b*1, 21*b*1) in a side direction of the glass panels and provided to support a side surface of the glass support insulation brackets (10*a*, 20*a*), and heat insulating connectors (11*b*3, 21*b*3) of elastic material coupled between the first plates (11*b*1, 21*b*1) and the second plates (11*b*2, 21*b*2); and rigid support members (11*c*, 21*c*) formed to be additionally fitted into the first plates (11*b*1, 21*b*1) of the side elastic insulating support assemblies (11*b*, 21*b*) and, at the same time, into the protruding edge portions (11*ae*, 21*ae*) of the side chassis portions (11*a*, 21*a*), wherein the rigid support members (11*c*, 21*c*) being provided as a reinforced synthetic resin material in a direction in which the window chassis (11, 21) overlap each other on side surfaces of the side elastic insulation support assemblies (11*b*, 21*b*), respectively, in order to control displacement of the side elastic insulating support assemblies (11*b*, 21*b*) so as to hold the glass panels (10*g*, 20*g*).

2. The window chassis insulating structure and glass panel supporting structure of two-side support frame window chassis at center bar portions according to claim 1, wherein the rigid support members (11*c*, 21*c*) comprise;

second fitting slots (11*c*1*s*, 21*c*1*s*) into which extended ends (11*b*2*a*, 21*b*2*a*) of the second plates (11*b*2, 21*b*2) of the side elastic insulating support assemblies (11*b*, 21*b*) are fitted and coupled;

step edge portions (11*c*1*e*, 21*c*1*e*) engaged with the protruding edge portions (11*ae*, 21*ae*) provided on inner extension support ends (11*a*1, 21*a*1) extending from the side chassis portions (11*a*, 21*a*) to center bar portions; and protruding side support ends (11*c*1, 21*c*1) between the second fitting slots (11*c*1*s*, 21*c*1*s*) and the stepped edge portions (11*c*1*e*, 21*c*11*e*).

3. The window chassis insulating structure and glass panel supporting structure of two-side support frame window chassis at center bar portions according to claim 2, wherein a gap (t) of clearance is maintained between the second fitting slots (11*c*1*s*, 21*c*1*s*) and the extended ends (11*b*2*a*, 21*b*2*a*) of the second plates (11*b*2, 21*b*2) of the side elastic insulation support assemblies (11*b*, 21*b*), whereby enabling a range of elastic movement or deformation of the second plates (11*b*2, 21*b*2), and elastically supporting side surfaces of the glass support insulation brackets (10*a*, 20*a*) supporting the glass panels.

4. The window chassis insulating structure and glass panel supporting structure of two-side support frame window chassis at center bar portions according to claim 2, wherein protruding fitting ends are provided on opposite surfaces of the first plates (11*b*1, 21*b*1) and the second plates (11*b*2, 21*b*2), respectively, into which both ends of the heat insulating connectors (11*b*3, 21*b*3) coupled therebetween are fitted, and the protruding fitting ends are formed to abut against and support the protruding side support ends (11*c*1, 21*c*1) of the rigid support members (11*c*, 21*c*).

5. The window chassis insulating structure and glass panel supporting structure of two-side support frame window chassis at center bar portions according to claim 4, wherein, in concave portions adjacent to outer protruding ends (11*a*2, 21*a*2) forming the first fitting slots (11*a*1*s*, 21*a*1*s*) on one surface of the inner extension support ends (11*a*1 and 21*a*1) of the side chassis portions (11*a* and 21*a*), left and right height correction insulation supports (11*d*, 21*d*) are provided so as to provide a heat insulation function while supporting the glass support insulation brackets (10*a*, 20*a*) at the same height from the inside and the outside, wherein second protruding side support ends (11*c*2, 21*c*2) are additionally formed in the rigid support members (11*c*, 21*c*), and wherein foam rubber insulating gaskets (11*e*, 21*e*) are additionally provided between the second protruding side support ends (11*c*2, 21*c*2) and the glass panels (10*g*, 20*g*).

6. The window chassis insulating structure and glass panel supporting structure of two-side support frame window chassis at center bar portions according to claim 1, wherein the rigid support members (11*c*, 21*c*) further comprise gasket grooves (11*c*3, 21*c*3) to which elastic gaskets (12, 22) are coupled as air tightness blocking members in a direction opposite to another symmetrically overlapping window chassis.

7. The window chassis insulating structure and glass panel supporting structure of two-side support frame window chassis at center bar portions according to claim 2, wherein the rigid support members (11*c*, 21*c*) further comprise gasket grooves (11*c*3, 21*c*3) to which elastic gaskets (12, 22) are coupled as air tightness blocking members in a direction opposite to another symmetrically overlapping window chassis.

8. The window chassis insulating structure and glass panel supporting structure of two-side support frame window chassis at center bar portions according to claim 3, wherein the rigid support members (11*c*, 21*c*) further comprise gasket grooves (11*c*3, 21*c*3) to which elastic gaskets (12, 22) are coupled as air tightness blocking members in a direction opposite to another symmetrically overlapping window chassis.

9. The window chassis insulating structure and glass panel supporting structure of two-side support frame window chassis at center bar portions according to claim 4, wherein the rigid support members (11*c*, 21*c*) further comprise gasket grooves (11*c*3, 21*c*3) to which elastic gaskets (12, 22) are coupled as air tightness blocking members in a direction opposite to another symmetrically overlapping window chassis.

10. The window chassis insulating structure and glass panel supporting structure of two-side support frame window chassis at center bar portions according to claim 6, wherein the elastic gaskets (12, 22) serving as air tightness blocking members comprise;

fixed ends fitted into the gasket grooves (11*c*3, 21*c*3) and fixed to the sliding window; and elastically deformable ends elastically deformed outwardly in contact with the rigid support members of another overlapping window chassis.

11. The window chassis insulating structure and glass panel supporting structure of two-side support frame window chassis at center bar portions according to claim 7, wherein the elastic gaskets (12, 22) serving as air tightness blocking members comprise;

fixed ends fitted into the gasket grooves (11*c*3, 21*c*3) and fixed to the sliding window; and elastically deformable ends elastically deformed outwardly in contact with the rigid support members of another overlapping window chassis.

12. The window chassis insulating structure and glass panel supporting structure of two-side support frame window chassis at center bar portions according to claim 8, wherein the elastic gaskets (12, 22) serving as air tightness blocking members comprises;

fixed ends fitted into the gasket grooves (11*c*3, 21*c*3) and fixed to the sliding window; and elastically deformable ends elastically deformed outwardly in contact with the rigid support members of another overlapping window chassis.

13. The window chassis insulating structure and glass panel supporting structure of two-side support frame window chassis at center bar portions according to claim 9, wherein the elastic gaskets (12, 22) serving as air tightness blocking members comprises;

fixed ends fitted into the gasket grooves (11*c*3, 21*c*3) and fixed to the sliding window; and elastically deformable ends elastically deformed outwardly in contact with the rigid support members of another overlapping window chassis.

* * * * *